US012568191B2

(12) United States Patent
Kim et al.

(10) Patent No.: US 12,568,191 B2
(45) Date of Patent: Mar. 3, 2026

(54) ELECTRONIC DEVICE AND METHOD FOR PROCESSING DATA RECEIVED FROM IN-VEHICLE ELECTRONIC DEVICE

(71) Applicant: THINKWARE CORPORATION, Seongnam-si (KR)

(72) Inventors: Daewon Kim, Seongnam-si (KR); Jeoungkyu Kang, Seongnam-si (KR); Taekyu Han, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 910 days.

(21) Appl. No.: 17/517,806

(22) Filed: Nov. 3, 2021

(65) Prior Publication Data

US 2022/0141426 A1 May 5, 2022

(30) Foreign Application Priority Data

| Nov. 3, 2020 | (KR) | ........................ 10-2020-0145604 |
| Nov. 4, 2020 | (KR) | ........................ 10-2020-0145854 |
| Nov. 2, 2021 | (KR) | ........................ 10-2021-0148755 |

(51) Int. Cl.
| *G07C 5/00* | (2006.01) |
| *G06V 10/82* | (2022.01) |
| *G06V 20/40* | (2022.01) |
| *H04N 7/18* | (2006.01) |

(52) U.S. Cl.
CPC ............. *H04N 7/183* (2013.01); *G06V 10/82* (2022.01); *G06V 20/40* (2022.01); *B60W 2556/10* (2020.02)

(58) Field of Classification Search
CPC ........ H04N 7/183; G06V 10/82; G06V 20/40; G06V 20/56; B60W 2556/10
USPC ........................................................... 701/33
See application file for complete search history.

(56) References Cited

U.S. PATENT DOCUMENTS

| 8,520,069 | B2 * | 8/2013 | Haler | ..................... | H04N 23/50 |
| | | | | | 340/936 |
| 8,880,281 | B2 * | 11/2014 | Giles | ...................... | G07C 5/085 |
| | | | | | 702/182 |
| 9,129,460 | B2 * | 9/2015 | McClellan | ............. | G07C 5/085 |
| 9,176,803 | B2 * | 11/2015 | Biberdorf | ............. | G06F 11/073 |
| 9,201,842 | B2 * | 12/2015 | Plante | .................... | B60R 11/04 |
| 9,315,152 | B1 * | 4/2016 | Maestas | ................. | G01S 19/13 |
| 9,349,229 | B2 * | 5/2016 | Hashimoto | ........... | G07C 5/085 |
| 9,361,650 | B2 * | 6/2016 | Binion | ................... | G06Q 40/08 |
| 9,373,202 | B2 * | 6/2016 | Shimizu | ................ | G07C 5/085 |

(Continued)

*Primary Examiner* — Jonathan M Dager
(74) *Attorney, Agent, or Firm* — WHDA, LLP

(57) ABSTRACT

Video streaming from the first external electronic device, such as the vehicle image acquisition device according to various embodiments, may be processed based on a designated state (e.g., a traffic accident) identified by the first external electronic device. For example, when receiving a notification related to a designated state from the first external electronic device, the electronic device may acquire information related to the designated state and then broadcast the obtained information to one or more terminals (e.g., terminal 130 of FIG. 5), through a second external electronic device such as a navigation server. In response to the broadcasting, the terminal may provide information related to the designated state to the user of the terminal. The information may be used to change a navigation path provided by the terminal.

12 Claims, 13 Drawing Sheets

(56) References Cited

U.S. PATENT DOCUMENTS

| | | | | |
|---|---|---|---|---|
| 9,432,430 | B1* | 8/2016 | Klenz | H04L 67/12 |
| 9,449,495 | B1* | 9/2016 | Call | H04W 4/029 |
| 9,767,625 | B1* | 9/2017 | Snyder | G07C 5/008 |
| 9,780,967 | B2* | 10/2017 | Sargent | G07C 5/008 |
| 10,035,514 | B1* | 7/2018 | Lambert | B60W 40/09 |
| 10,176,524 | B1* | 1/2019 | Brandmaier | G08G 1/0129 |
| 10,360,739 | B2* | 7/2019 | Palmer | H04N 7/18 |
| 10,504,302 | B1* | 12/2019 | Chavez | H04W 4/90 |
| 10,565,171 | B1* | 2/2020 | Bruno | G06F 16/35 |
| 10,796,579 | B2* | 10/2020 | Sharma | G08G 1/166 |
| 10,878,646 | B2* | 12/2020 | Plante | G07C 5/0866 |
| 10,984,275 | B1* | 4/2021 | Campbell | H04N 21/42202 |
| 11,565,717 | B2* | 1/2023 | Kothbauer | G05D 1/223 |
| 12,148,318 | B1* | 11/2024 | Lambert | G06V 20/597 |
| 2003/0065432 | A1* | 4/2003 | Shuman | B60R 25/00 |
| | | | | 701/1 |
| 2003/0154009 | A1* | 8/2003 | Basir | G07C 5/0866 |
| | | | | 348/148 |
| 2006/0212195 | A1* | 9/2006 | Veith | G06Q 10/06 |
| | | | | 701/33.4 |
| 2007/0132773 | A1* | 6/2007 | Plante | G07C 5/0891 |
| | | | | 345/564 |
| 2007/0136078 | A1* | 6/2007 | Plante | G07C 5/085 |
| | | | | 348/148 |
| 2007/0219686 | A1* | 9/2007 | Plante | H04N 7/188 |
| | | | | 701/33.4 |
| 2007/0257782 | A1* | 11/2007 | Etcheson | G08B 23/00 |
| | | | | 340/521 |
| 2008/0147267 | A1* | 6/2008 | Plante | G07C 5/008 |
| | | | | 348/E7.086 |
| 2008/0234890 | A1* | 9/2008 | Okada | G01P 1/127 |
| | | | | 701/33.4 |
| 2008/0319604 | A1* | 12/2008 | Follmer | G07C 5/0891 |
| | | | | 701/33.4 |
| 2010/0191411 | A1* | 7/2010 | Cook | G07C 5/0841 |
| | | | | 707/754 |
| 2011/0153199 | A1* | 6/2011 | Morimoto | G08G 1/205 |
| | | | | 701/533 |
| 2011/0213526 | A1* | 9/2011 | Giles | G07C 5/085 |
| | | | | 701/33.4 |
| 2013/0096731 | A1* | 4/2013 | Tamari | G06F 11/3058 |
| | | | | 701/1 |
| 2014/0049406 | A1* | 2/2014 | Shin | G08G 1/0112 |
| | | | | 340/905 |
| 2015/0112800 | A1* | 4/2015 | Binion | G06Q 30/0255 |
| | | | | 705/14.53 |
| 2016/0163207 | A1* | 6/2016 | Kim | G08G 5/22 |
| | | | | 701/301 |
| 2017/0164158 | A1* | 6/2017 | Watkins | H04W 4/027 |
| 2017/0221283 | A1* | 8/2017 | Pal | G06Q 40/08 |
| 2017/0341611 | A1* | 11/2017 | Baker | B60R 21/16 |
| 2018/0014182 | A1* | 1/2018 | Jaegal | B60K 35/215 |
| 2018/0026669 | A1* | 1/2018 | Edwards | G08B 21/06 |
| | | | | 455/418 |
| 2018/0032829 | A1* | 2/2018 | Kim | G08B 13/19645 |
| 2018/0103206 | A1* | 4/2018 | Olson | H04N 23/6812 |
| 2018/0215344 | A1* | 8/2018 | Santora | B60R 25/33 |
| 2018/0225894 | A1* | 8/2018 | Mays | G07C 5/008 |
| 2018/0367731 | A1* | 12/2018 | Gatti | H04N 21/4223 |
| 2019/0012908 | A1* | 1/2019 | Chun | G08G 1/04 |
| 2019/0072974 | A1* | 3/2019 | Hwang | G01C 21/3415 |
| 2019/0188930 | A1* | 6/2019 | Tsukahara | G07C 5/00 |
| 2019/0244301 | A1* | 8/2019 | Seth | G06F 16/73 |
| 2019/0248375 | A1* | 8/2019 | Fuentes | B60W 40/09 |
| 2019/0259282 | A1* | 8/2019 | Ji | B60W 30/18154 |
| 2019/0324450 | A1* | 10/2019 | Lurie | H04L 12/40026 |
| 2019/0370577 | A1* | 12/2019 | Meng | G05D 1/0061 |
| 2019/0375357 | A1* | 12/2019 | Mezaael | B60R 16/023 |
| 2020/0064833 | A1* | 2/2020 | Fox | B60W 60/0057 |
| 2020/0168014 | A1* | 5/2020 | Uliyar | G06V 20/46 |
| 2020/0189585 | A1* | 6/2020 | Sin | H04W 4/46 |
| 2020/0201356 | A1* | 6/2020 | Schuh | B60W 30/165 |
| 2020/0250901 | A1* | 8/2020 | Golov | B60R 21/0134 |
| 2021/0004909 | A1* | 1/2021 | Farmer | G06Q 40/08 |
| 2021/0012588 | A1* | 1/2021 | Kwon | G07C 5/008 |
| 2021/0044737 | A1* | 2/2021 | Kang | H04N 21/25816 |
| 2021/0094582 | A1* | 4/2021 | Lee | G11B 27/031 |
| 2021/0291839 | A1* | 9/2021 | Hutchings | A61B 5/18 |
| 2021/0295621 | A1* | 9/2021 | Kang | G06F 3/0485 |
| 2021/0329116 | A1* | 10/2021 | Kim | H04M 1/72439 |
| 2021/0383623 | A1* | 12/2021 | Tokman | G07C 5/0808 |
| 2021/0409657 | A1* | 12/2021 | Tomizawa | G06V 10/56 |
| 2022/0141426 | A1* | 5/2022 | Kim | H04N 7/183 |
| | | | | 348/148 |
| 2022/0159185 | A1* | 5/2022 | Kim | H04N 23/69 |
| 2023/0206470 | A1* | 6/2023 | Kim | G06T 7/248 |
| | | | | 382/103 |
| 2023/0290199 | A1* | 9/2023 | Gyllenhammar | G07C 5/085 |
| 2024/0013237 | A1* | 1/2024 | Folkens | G06V 10/44 |
| 2024/0163419 | A1* | 5/2024 | Watkins | G06T 7/0002 |
| 2024/0323035 | A1* | 9/2024 | Ryu | G06F 16/29 |
| 2024/0348750 | A1* | 10/2024 | Cheung | H04N 21/2343 |
| 2025/0071399 | A1* | 2/2025 | Jeong | H04N 23/50 |

* cited by examiner

| NUMBER | BASIC INFORMATION | EXPLANATION | DATA TYPE | ESSENTIAL |
|---|---|---|---|---|
| 1 | msdVersion | VERSION OF MINIMUM ACCIDENT INFORMATION | INTEGER | M |
| 2 | messageIdentifier | MESSAGE NUMBER OF MINIMUM INCIDENT INFORMATION | INTEGER | M |
| 3 | Control | CONTROL TYPE | SEQUENCE | M |
| 4 | vehicleIdentificationNumber | VEHICLE IDENTIFICATION NUMBER | STRING | M |
| 5 | VehiclePropulsionStorageType | VEHICLE FUEL | SEQUENCE | M |
| 6 | timeStamp | ACCIDENT JUDGMENT TIME | INTEGER | M |
| 7 | vegicleLocation | VEHICLE LOCATION | INTEGER | M |
| 8 | vehicleDirection | VEHICLE DIRECTION | INTEGER | M |
| 9 | recentVegicleLocationN1 | RECENT VEHICLE LOCATION N1 | INTEGER | M |
| 10 | recentVegicleLocationN2 | RECENT VEHICLE LOCATION N2 | INTEGER | M |
| 11 | numberOfPassengers | NUMBER OF PASSENGER | INTEGER | O |
| 12 | AdditionalData | ADDITIONAL INFORMATION | STRING | O |

FIG. 7

| Data type | STRING |
|---|---|
| Constraints | 17 bytes |
| ASN 1 DEFINITION | VIN::= SEQUENCE {<br>   isowmi PrintableString (SIZE(3))<br>   (FROM("A".."H" \| "J".."N" \| "P" \| "R".."Z" \| "0".."9"))<br>   isovds PrintableSting (SIZE(6))<br>   (FROM("A".."H" \| "J".."N" \| "P" \| "R".."Z" \| "0".."9"))<br>   isovisModelyear PrintableString (SIZE(1))<br>   (FROM("A".."H" \| "J".."N" \| "P" \| "R".."Z" \| "0".."9"))<br>   isovisSeqPlant PrintableString (SIZE(7))<br>   (FROM("A".."H" \| "J".."N" \| "P" \| "R".."Z" \| "0".."9"))<br>} |

FIG. 8

ELECTRONIC DEVICE AND METHOD FOR PROCESSING DATA RECEIVED FROM IN-VEHICLE ELECTRONIC DEVICE

CROSS-REFERENCE TO RELATED APPLICATION(S)

This application claims the benefit under 35 U.S.C. § 119(a) of Korean patent applications filed in the Korean Intellectual Property Office on Nov. 3, 2020, Nov. 4, 2020, and Nov. 2, 2021, respectively, and assigned Serial Nos. 10-2020-0145604, 10-2020-0145854, and 10-2021-0148755, the disclosure of which is incorporated by reference herein in its entirety.

BACKGROUND

Field

Various embodiments disclosed in this document relate to an electronic device and method for processing data obtained and received by an electronic device for a vehicle.

Description of Related Art

An image acquisition device for a vehicle called a so-called car dashboard camera may be disposed in the vehicle. In a state of driving the vehicle, the image acquisition device for a vehicle may detect a specified state (e.g., sudden braking and/or collision) of the vehicle and store a video based thereon.

SUMMARY

With the development of communication technology, a method for quickly recognizing data being captured by a vehicle data acquisition device and/or a specified state and/or event recognized by the vehicle data acquisition device, and performing a related function based on the recognition result may be required.

An electronic device according to various embodiments may comprise a communication circuitry; and a memory storing a plurality of instructions: and at least one processor operably coupled to the communication circuitry and the memory wherein the plurality of instructions, when being executed by the at least one processor, cause the at least one processor to: receive, from a first external electronic device distinct from the electronic device, video by using the communication circuitry; receive, in a state that has received the Video, a first signal notifying to enter a specified state, from the first external electronic device; in response to the reception of the first signal, identify information associated with the received video; and in response to the identification of the information, transmit, to a second external electronic device distinct from the first external electronic device, a second signal including at least portion of the information.

A terminal according to various embodiments may comprise a built-in display; a communication circuitry; a memory storing a plurality of instructions: and at least one processor operably coupled to the built-in display, the communication circuitry, and the memory, wherein the plurality of instructions, when being executed by the at least one processor, cause the at least one processor to: communicate with a first external electronic device, based on a specified application; receive information associated with a second external electronic device distinct from the first external electronic device, from the first external electronic device;

identify an external display distinct from the built-in display, in response to the reception of the information; display a first Visual element associated with the information on the external display, in a first state in which the external display is connected to the terminal; display the first visual element, in a second state distinct from the first state; and in response to an identification of a user input associated with the first visual element in a state displaying the first visual element, a second visual element, associated with the first visual element, including at least portion of the information, and wherein the second visual element is displayed on the built-in display in the first state and is displayed on the external display in the second state.

The electronic device according to various embodiments can quickly recognize data being captured by the vehicle data acquisition device and/or events occurring in the vehicle in which the vehicle data acquisition device is arranged and perform related functions based on the recognition result.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a diagram illustrating a data structure of MSD (Minimum Set of Data) generated by an electronic device according to an embodiment;

FIG. 8 is a diagram illustrating a data type, a restriction, and a definition of information (Vehicle Identification Number) referred to as sequence number 4 of FIG. 7;

DETAILED DESCRIPTION

Figure 1:
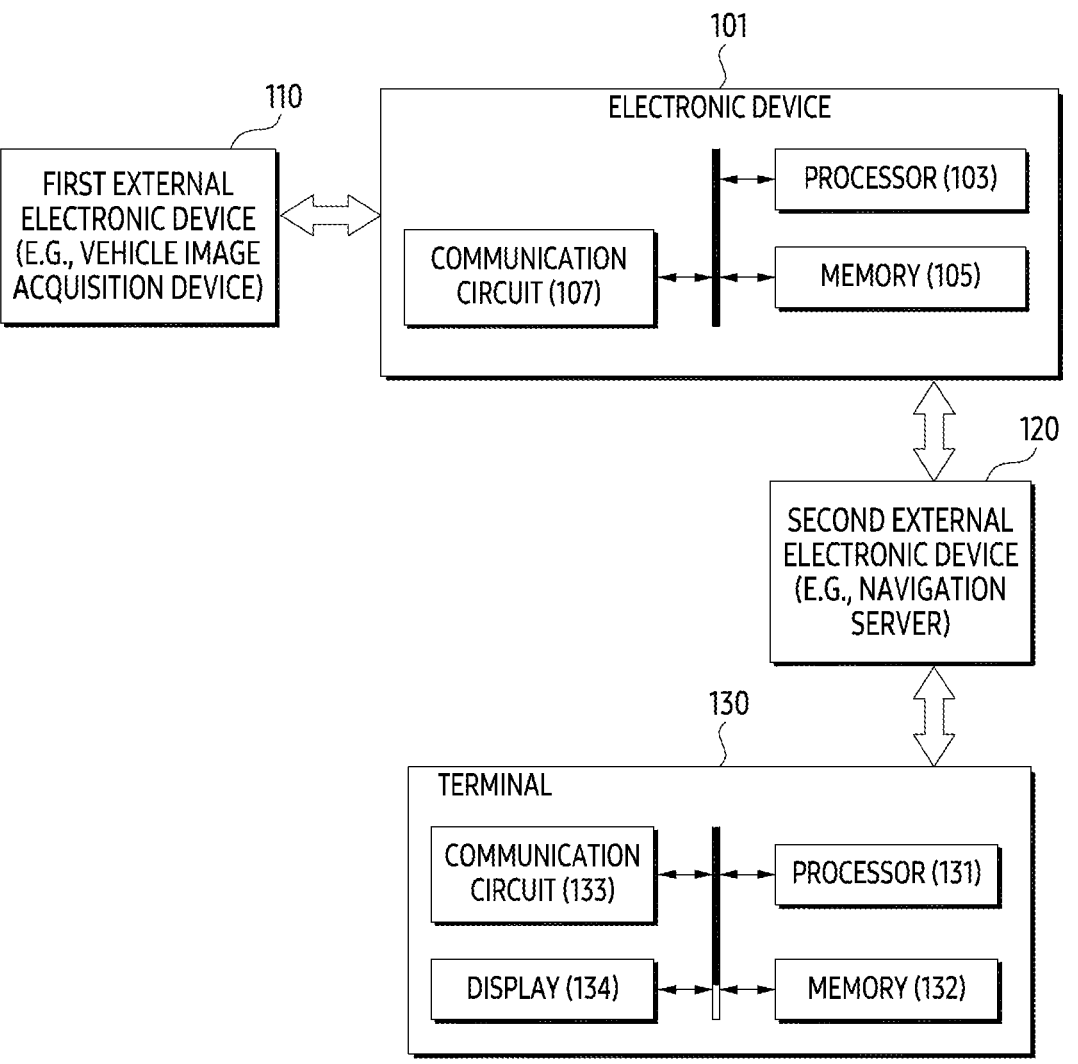
FIG. 1 is a block diagram related to an embodiment of an electronic device connected through a network.

Specific structural or functional descriptions of the embodiments according to the concept of this invention disclosed herein are illustrated only for the purpose of describing the embodiments according to the concept of this invention, and the embodiments according to this invention may be implemented in various forms and are not limited to the embodiments described.

Since the embodiments according to the concept of the present invention may make various changes and have various forms, the embodiments will be illustrated in the drawings and described in detail in the present specification. However, this is not intended to limit the embodiments according to the concept of the present invention to specific disclosed forms, and includes changes, equivalents, or substitutes included in the spirit and technical scope of the present invention.

Terms such as first or second may be used to describe various elements but the tints should not be limited thereto. The above terms are used only for the purpose of distinguishing one element from other elements, for example, without departing from the scope of rights according to the concept of the present invention, a first element may be referred as a second element, and similarly, the second component may also be referred to as the first component.

When a component is referred to as being "connected" or "accessed" to another component, it should be understood that another component may be directly connected or connected to the other component, but another component may exist in the middle. On the other hand, when a component is referred to as being "directly connected" or "directly accessed" to another component, it should be understood that no other component exists in the middle. Expressions explaining the relationship between components, such as "between" and "among" or "in direct neighborhood to", should also be interpreted.

The terms used in the present specification are used only to describe specific embodiments, and are not intended to limit the present invention. The singular expression includes plural expressions unless they are explicitly meant differently in the context. In this specification, terms such as "comprise" or "include" are intended to designate the existence of the described features, numbers, stages, operations, components, parts, or combinations thereof, and it should be understood that it does not preclude the possibility of addition or existence of one or more other features or numbers, stages, operations, components, parts, or combinations thereof.

Unless defined otherwise, all terms used herein, including technical and scientific terms, have the same meaning as commonly understood by one of ordinary skill in the art to which this invention belongs. Terms such as those defined in commonly used dictionaries should be interpreted as having meanings consistent with the contextual meanings of the relevant technology and not as ideal or excessively formal unless clearly defined herein.

Hereinafter, embodiments will be described in detail with reference to the accompanying drawings. However, the scope of the patent application is not limited or confined by these embodiments. The same reference numerals presented in each drawing indicate the same element.

FIG. 1 is a block diagram related to an embodiment of an electronic device 101 connected through a network. Referring to FIG. 1, the electronic device 101 may be connected to the first external electronic device 110 and the second external electronic device 120 based on a wired network and/or a wireless network. The second external electronic device 120 may be connected to one or more terminals 130 through a wired network and/or a wireless network. In an embodiment, the first external electronic device 110 may include at least one vehicle image acquisition device disposed in the vehicle. In an embodiment, the vehicle image acquisition device may include a device capable of receiving a light signal reflected from a subject by an image sensor, such as a vehicle video recorder, a car dashboard camera and the like and converting the light signal into an electrical image signal.

In an embodiment, the second external electronic device 120 may provide information (e.g., navigation information) for guiding the movement of the vehicle to one or more terminals 130. In an embodiment, the second external electronic device 120 may correspond to a server (e.g., a navigation server) of a navigation service for providing navigation information. In an embodiment, the second external electronic device 120 may correspond to an autonomous driving server that generates an autonomous driving algorithm for supporting an autonomous driving function of a vehicle. For example, the second external electronic device 120 may correspond to an autonomous driving server that supports an autonomous driving function of a vehicle, by receiving video streaming obtained by the first external electronic device 110 through the electronic device 101 connected to the network, after generating an algorithm or artificial neural network for autonomous driving of a vehicle equipped with the electronic device 101 according to the machine learning-based autonomous driving algorithm, and transmitting the generated route information for autonomous driving to the electronic device 101. In an embodiment, the processor 103 of the electronic device 101 may generate a control command for controlling autonomous driving of vehicle. The control command for controlling the autonomous driving of the vehicle the may include an acceleration command, a deceleration command, a steering wheel angle control command, a turn indicator light control command, a wiper control command, and the like. In an embodiment, when a processor of an autonomous driving control system for generating a control command for autonomous driving of a vehicle exists separately, the processor 103 of the electronic device 101 may output the control command to a processor of the autonomous driving control system.

Although only one first external electronic device 110 and one second external electronic device 120 are illustrated, the number of first external electronic devices 110 and the number of second external electronic devices 120 capable of simultaneously communicating with the electronic device 101 may be one or more. The wired network may include a network such as Internet, local area network (LAN), wide area network (WAN), Ethernet, or a combination thereof. The wireless network may include networks such as Long Term Evolution (LTE), 5g New Radio (NR), Wireless Fidelity (WiFi), Zigbee, Near Field Communication (NFC), Bluetooth, Bluetooth Low-Energy (BLE) or a combination thereof. Although the electronic device 101 the first external electronic device 110, and the second external electronic device 120 are illustrated as being directly connected, the electronic device 101, the first external electronic device 110, and the second external electronic device 120 may be indirectly connected through one or more routers and/or access points (AP).

Referring to FIG. 1, the electronic device 101 according to an embodiment may include at least one of a processor 103, a memory 105, and a communication circuit 107. The processor 103, the memory 105, and the communication circuit 107 may be electrically and/or operatively coupled with each other by an electronic component such as a communication bus. The type and/or number of hardware components included in the electronic device 101 are not limited to those illustrated in FIG. 1. For example, the electronic device 101 may include only some of the hardware components illustrated in FIG. 1.

The processor 103 of the electronic device 101 according to an embodiment may include hardware components for processing data based on one or more instructions. For example, hardware components for processing data may include Arithmetical and Logic Unit (ALU), Field Programmable Gate Array (FPGA), and/or Central Processing Unit (CPU). The number of processors 103 may be one or more. For example, the processor 103 may have a structure of a multi-core processor such as a dual core, a quad core, or a hexa core.

The memory 105 of the electronic device 101 according to an embodiment may include hardware components for storing data and/or instructions input and/or output to the processor 103. The memory 105 may include, for example, volatile memory such as Random Access Memory (RAM) and/or non-volatile memory such as Read-Only Memory (ROM). Volatile memory may include, for example, at least one of Dynamic RAM (DRAM), Static RAM (SRAM), Cache RAM, and Pseudo SRAM (PSRAM). The nonvolatile memory may include, for example, at least one of Programmable ROM (PROM), Erasable PROM (EPROM), Electrically Erasable PROM (EEPROM), flash memory, hard disk, compact disk, and Embedded Multi-Media Card (eMMC).

In the memory 105, one or more instructions indicating an operation to be performed by the processor 103 may be stored in the data. A set of instructions may be referred to as firmware, operating system, process, routine, sub-routine and or application. For example, the processor 103 of the electronic device 101 and/or the electronic device 101 may perform at least one of the operations of FIGS. 2 to 3 by executing a set of plurality of instructions distributed in the form of an application.

The communication circuit 107 of the electronic device 101 according to an embodiment may include hardware components for supporting transmission and/or reception of electrical signals between the electronic device 101 and another electronic device distinguished from the electronic device 101 (e.g., the first external electronic device 110 and/or the second external electronic device 120). The communication circuit 107 may include, for example, at least one of modem, antenna, and an Optical Electronic (O/E) converter. Communication circuit 107 may support transmission and/or reception of electrical signals based on various types of protocols such as Ethernet, Local Area Network (LAN), Wide Area Network (WAN), Wireless Fidelity (WiFi), Bluetooth, Bluetooth Low Energy (BLE), ZigBee, Long Term Evolution (LTE), 5G New Radio (NR), and etc.

The electronic device 101 according to various embodiments may receive a video being captured by the first external electronic device 110. In a state of receiving the video, the electronic device 101 may receive a notification related to a designated state transmitted from the first external electronic device 110. The designated state may include, for example, a state in which an impact amount exceeding a specified threshold is applied to the first external electronic device 110 and/or the vehicle in which the first external electronic device 110 is disposed. The impact amount may be identified by, for example, an acceleration sensor and/or a gyro sensor included in the first external electronic device 110. The impact amount may be related to, for example, a collision and/or an accident occurring in a vehicle in which the first external electronic device 110 is disposed.

In response to receiving a notification related to a designated state, the electronic device 101 may store a video received from the first external electronic device 110. The electronic device 101 may obtain information related to the stored video. The information may include, for example, information related to the location of the first external electronic device 110 and/or the amount of impact identified by the first external electronic device 110. The electronic device 101 may transmit the obtained information to the second external electronic device 120. The second external electronic device 120 may transmit information received from the electronic device 101 to at least one terminal 130 related to the location of the first external electronic device 110.

In the above-described embodiment, it is described that the first external electronic device 110 obtains and stores a video, but the present invention is not limited thereto. For example, when the first external electronic device 110 includes Light Detection and Ranging (LiDAR) sensor and/or Radio Detection and Ranging (RADAR) sensor, Sensor information obtained by the LiDAR sensor and/or the RADAR sensor or information combined with reconstructed information using a camera may be transmitted to the second external electronic device 120.

Referring to FIG. 1, the terminal 130 may include at least one of processor 131, a memory 132, a communication circuit 133, a display 134, and a sensor 135. The processor 131, the memory 132, the communication circuit 133, the display 134, and/or the sensor 135 may be electrically connected by a communication bus. Each of the processor 131, the memory 132, and the communication circuit 133 may operate at least partially similar to the processor 103, the memory 105, and the communication circuit 107.

The terminal 130 may display a user interface (UI) based on information received from the second external electronic device 120 on the display 134. An operation in which the terminal 130 displays the UI based on information received from the second external electronic device 120 will be described in detail with reference to FIGS. 4 to 5.

Figure 2:
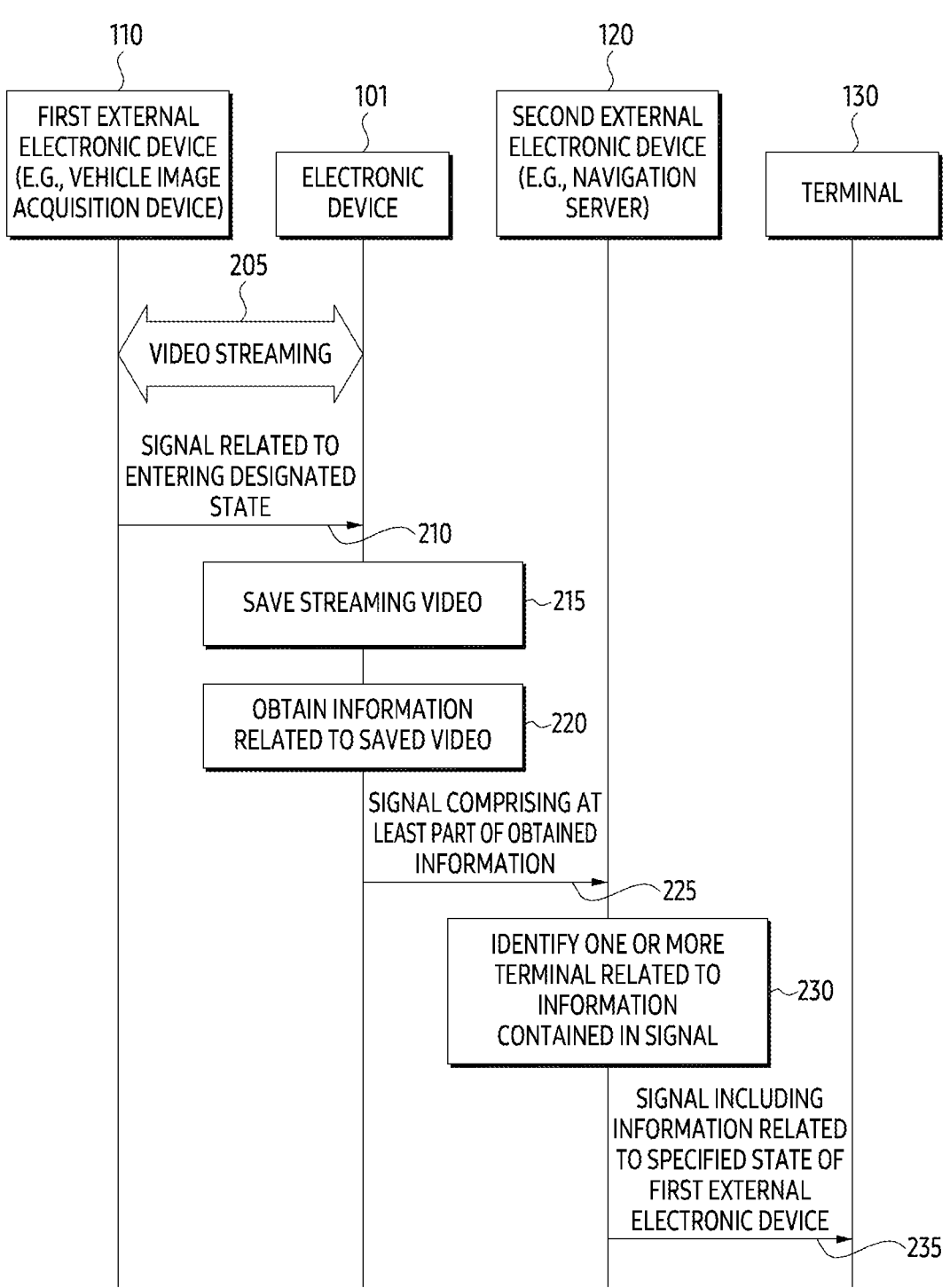
FIG. 2 is a signal flowchart illustrating an operation of an electronic device according to various embodiments.

FIG. 2 is a signal flowchart illustrating an operation of the electronic device 101 according to various embodiments. Each of the electronic device 101, the first external electronic device 110, the second external electronic device 120, and the terminal 130 of FIG. 2 may include the electronic device 101, the first external electronic device 110, the second external electronic device 120, and the terminal 130. For example, at least one of the operations of the electronic device 101 shown in FIG. 2 may be performed by the electronic device 101 and/or the processor 103 of FIG. 1.

Referring to FIG. 2, in operation 205, the electronic device 101 according to an embodiment may receive a video being captured from the first external electronic device 110. The video may be streamed based on a real time video transferring protocol.

In an embodiment, the streaming of the video may be executed on a condition that satisfies a specified criterion. For example, when electronic devices (e.g., an electronic map previously stored in the terminal 130 and an image (or video) acquired through the first external electronic device 110) related to the first external electronic device 110 are different from each other, the first external electronic device 110 may execute streaming of the video. As another example, the first external electronic device 110 may execute streaming of the video based on identifying that the mode of the vehicle including the first external electronic device 110 is changed from the autonomous driving mode to the manual driving mode. However, it is not limited thereto. As another example, the first external electronic device 110 may execute streaming of the video when information (location, form) of objects previously stored in the electronic device (e.g., terminal 130) related to the first external electronic device 110 and information (location, form) of objects existing in the video obtained through the first external electronic device 110 are different from each other. Here, the objects may include a traffic light, a crosswalk, a boundary stone, a tree, a speed bump, a street lamp, a median, a lane, a toll gate, a road sip, a road mark, and the like. In one embodiment, streaming of the video may be executed for a designated time from a timing at which the designated reference is detected. However, it is not limited thereto.

In a state in which streaming based on operation 205 is performed in the electronic device 101 and the first external electronic device 110, the first external electronic device 110 may identify an impact amount that exceeds a threshold applied to the first external electronic device 110 and/or the vehicle (e.g., the vehicle in which the first external electronic device 110 is disposed). In response to the identification of the impact amount, the first external electronic device 110 may transmit a signal 210 notifying an entry into a designated state related to the impact amount to the electronic device 101. The signal 210 may include at least one of GPS coordinates of the first external electronic device 110, an impact amount identified by the first external electronic device 110, and a video frame and an audio frame captured by the first external electronic device 110 at the moment when the impact amount is identified.

In response to reception of the signal 210, in operation 215, the electronic device 101 according to an embodiment may store a video being streamed. The storing of the video by the electronic device 101 may include an operation of storing at least a part of information included in the signal 210 in the metadata of the video. In an embodiment, storing the video may mean storing the video in another storage device distinct from a buffer used for streaming the video so that it may be further processed through operation 205. In an embodiment, storing the video may include storing it in a storage device of another electronic device that distinguishes the video from the electronic device 101 and executes the recognition so as to execute the recognition of the video. However, it is not limited thereto. In an embodiment, the length of the time interval for maintaining the storage may be changed according to the type of signal in operation 210. However, it is not limited thereto.

In an embodiment, the video may be discarded after a specified time elapses when the signal is not received. For example, the designated time may be determined based on the size of a buffer configured to temporarily store the video. However, it is not limited thereto.

Referring to FIG. 2, in operation 220, the electronic device 101 according to an embodiment may obtain information related to the stored video. The information may include at least some of information related to a designated state included in the signal 210 and/or a result of recognizing a video being streamed. For example, the electronic device 101 may recognize a video using a neural network and identify information related to a specified state (e.g., an external vehicle and/or pedestrian related to the identified impact amount) from the video.

In response to the acquisition of information, the electronic device 101 may transmit a signal 225 including at least a portion of the obtained information to the second external electronic device 120 distinguished from the first external electronic device 110. The signal 225 may include at least some of information obtained in operation 220 and/or information included in the signal 210.

In response to reception of the signal 225, in operation 230, the second external electronic device 120 may identify one or more terminals related to information included in the signal. For example, based on the location of the first external electronic device 110 included in the signal 210, the second external electronic device 120 may identify one or more terminals related to the location of the first external electronic device 110. For example, the second external electronic device 120 may identify one or more terminals existing within a specified distance around the location of the first external electronic device 110. For example, the second external electronic device 120 may identify one or more terminals being moved based on at least a partial overlapping path with the location of the first external electronic device 110. As shown in FIG. 2, it is assumed that the second external electronic device 120 identifies at least one terminal including the terminal 130.

The second external electronic device 120 may transmit a signal 235 including information related to a designated state of the first external electronic device 110 to one or more terminals related to a location of the first external electronic device 110 including the terminal 130. The terminal 130 may receive the signal including the information. In an embodiment, the terminal 130 may change at least a part of a navigation service provided from the second external electronic device 120 based on receiving the signal. For example, the terminal 130 may change a path guided in the vehicle for moving the vehicle including the terminal 130. For example, when the information indicates that there is an external object such as a port hole or a speed bump that is not included in the electronic map, the terminal 130 may change a path displayed on the display of the terminal 130 for the navigation service to bypass the location of the external object. However, it is not limited thereto. In an embodiment, the terminal 130 may change at least a part of an autonomous driving function according to an autonomous driving algorithm or an artificial neural network provided from the second external electronic device 120 based on receiving the signal. For example, the terminal 130 may change the autonomous driving path of the vehicle to move the vehicle including the terminal 130. For example, when the information indicates that an external object not included in the electronic map for pre-stored autonomous driving exists, the terminal 130 may generate a control command for changing the autonomous driving path to avoid collision with the external object or bypass the external object. However, it is not limited thereto.

In addition, in the above-described embodiment, the first external electronic device 110 executes streaming of the video to the electronic device 101, but the present invention is not limited thereto. For example, when non-visual sensors such as Lidar and RADAR are further included in addition to visual sensors such as image sensors, the first external electronic device 110 may stream to the electronic device 101 including sensor information obtained by Lidar and RADAR in addition to video streaming. Additionally, when the first external electronic device 110 performs streaming of the video and the sensor information to the electronic device 101, location information obtained from the video and the sensor information may be included. In an embodiment, the terminal 130 may identify that security of the transportation infrastructure is required based on receiving the signal, and may execute at least one operation based on the identification. For example, when the terminal 130 is a device included in a vehicle repairing a traffic infrastructure, terminal 130 may display a notification indicating where the transportation infrastructure structures requiring repair are located through the display of terminal 130. However, it is not limited thereto.

In an embodiment, the signal 235 may include information for changing a UI displayed on the terminal 130. An example of a UI displayed by the terminal 130 in response to reception of the signal 235 will be described in detail with reference to FIG. 5.

Figure 3:
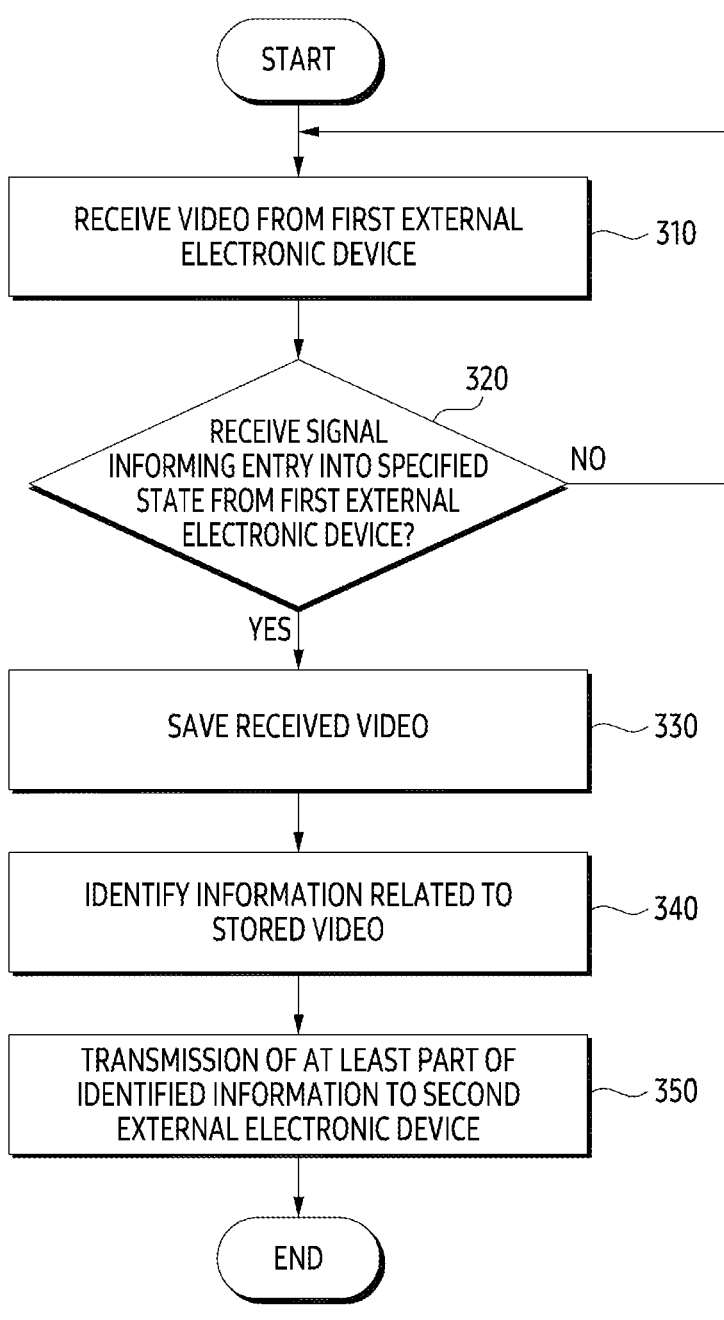
FIG. 3 is a flowchart of an electronic device according to an embodiment.

FIG. 3 is a flowchart of an electronic device according to an embodiment. The electronic device of FIG. 3 may include the electronic device 101 of FIGS. 1 to 2. At least one of the operations of FIG. 3 may be executed by the electronic device 101 and/or the processor 103 of FIG. 1.

Referring to FIG. 3, in operation 310, the electronic device according to an embodiment may receive a video from a first external electronic device (e.g., the first external electronic device 110 of FIGS. 1 to 2). Operation 310 may be performed similarly to operation 205 of FIG. 2.

Referring to FIG. 3, in operation 320, the electronic device according to an embodiment may determine whether a signal notifying entry into a designated state is received from the first external electronic device. The signal may include, for example, the signal 210 of FIG. 2. For example, the signal may include information related to an accident identified by the first external electronic device.

When a signal notifying entry into a designated state is not received from the first external electronic device (320—No), the electronic device may maintain a state in which the electronic device receives a video based on operation 310. When a signal notifying entry into a designated state is received from the first external electronic device (320— yes), in operation 330, the electronic device may store the received video. Operation 330 may be performed similarly to operation 215 of FIG. 2.

Referring to FIG. 3, in operation 340, the electronic device according to an embodiment may identify information related to the stored video. Operation 340 may be performed similarly to operation 220 of FIG. 2.

In response to identification of video-related information, in operation 350, the electronic device according to an embodiment may transmit at least part of the identified information to the second external electronic device (e.g., the second external electronic device 120 of FIGS. 1 to 2). The information transmitted by the electronic device to the second external electronic device 120 may correspond to, for example, information included in the signal 225 of FIG. 2. Upon receiving the information of operation 350, the second external electronic device may broadcast information related to entry of the first external electronic device into a designated state to one or more terminals.

Figure 4:
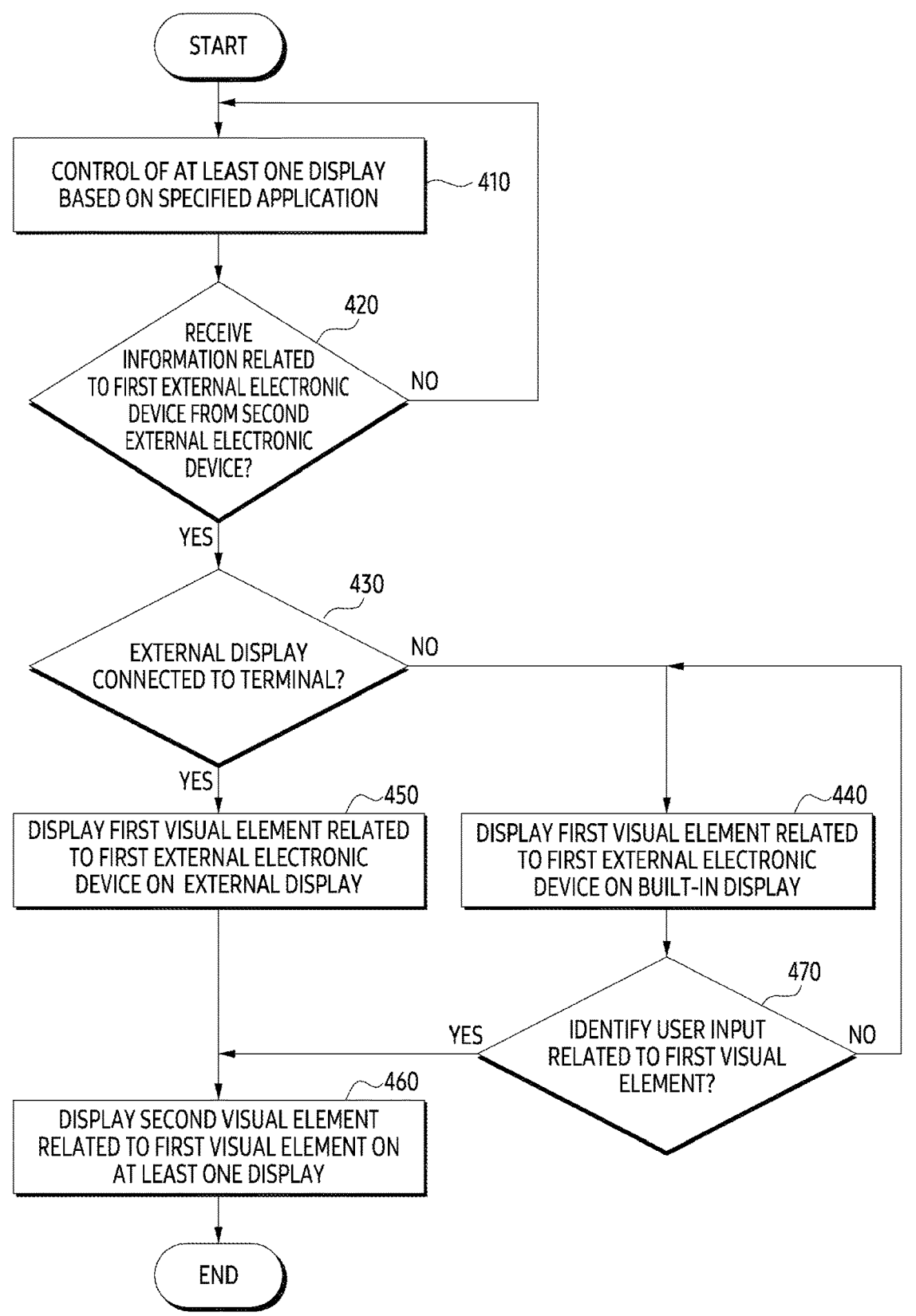
FIG. 4 is a flowchart of a terminal processing information provided from an electronic device according to an embodiment.

FIG. 4 is a flowchart of a terminal processing information provided from an electronic device according to an embodiment. The information may be provided to the terminal 130 via the electronic device 101 and the second external electronic device 120 of FIGS. 1 to 2. The terminal of FIG. 4 may include the terminal 130 of FIGS. 1 to 2. The operation of FIG. 4 may be performed by the terminal 130 and/or the processor 131 of FIGS. 1 to 2.

Referring to FIG. 4, in operation 410, the terminal according to an embodiment may control at least one display based on a designated application. The designated application may include, for example, a navigation application. The at least one display may include an embedded display (e.g., a touch screen) included in the terminal. The at least one display may include an external display connected to a terminal based on an interface such as HDMI, USB-C, D-SUB, and/or WIDI. Operation 410 may be performed, for example, in a state of guiding a path based on a navigation application.

When the at least one display is controlled based on operation 410, in operation 420, the terminal according to an embodiment may determine whether information related to the first external electronic device (e.g., the first external electronic device 110 of FIGS. 1 to 2) is received from the second external electronic device (e.g., the second external electronic device 120 of FIGS. 1 to 2). The information may include, for example, information related to an accident identified by the first external electronic device as a signal included in the signal 235 of FIG. 2.

When information related to the first external electronic device is not received (420—No), the terminal may maintain control of at least one display based on operation 410. In response to receiving information related to the first external electronic device (420—yes), in operation 430, the terminal according to an embodiment may identify whether the external display is connected to the terminal.

When the external display is not connected to the terminal (430—No), in operation 140, the terminal may display a first visual element related to the first external electronic device on the internal display. The first visual element may include at least one of text, icons, images, and animations for notifying an accident identified by the first external electronic device. When the external display is connected to the terminal (430—Yes), in operation 450, the terminal may display the first visual element related to the first external electronic device on the external display.

When the first visual element is displayed based on operation 440, in operation 470, the terminal according to an embodiment may identify a user input related to the first visual element from the user. The user input may include a user's gesture of touching and/or clicking a first visual element. When responding to identifying the user input related to the first visual element (470—Yes), in operation 460, the terminal may display the second visual element related to the first visual element on at least one display. The second visual element may include information related to an accident identified by the first external electronic device.

Referring to FIG. 4, displaying the second visual element based on operation 460 may be performed differently depending on whether an external display is connected. For example, when an external display is connected to a terminal, the terminal may display the second visual element on at least one of the external display and/or the internal display in operation 460 based on the state in which the first visual element is displayed on the external display in operation 450. For example, in case that the external display is not connected to the terminal, the terminal may display the second visual element in the built-in display when a user input is performed based on operations 440 and 470.

Figure 5:
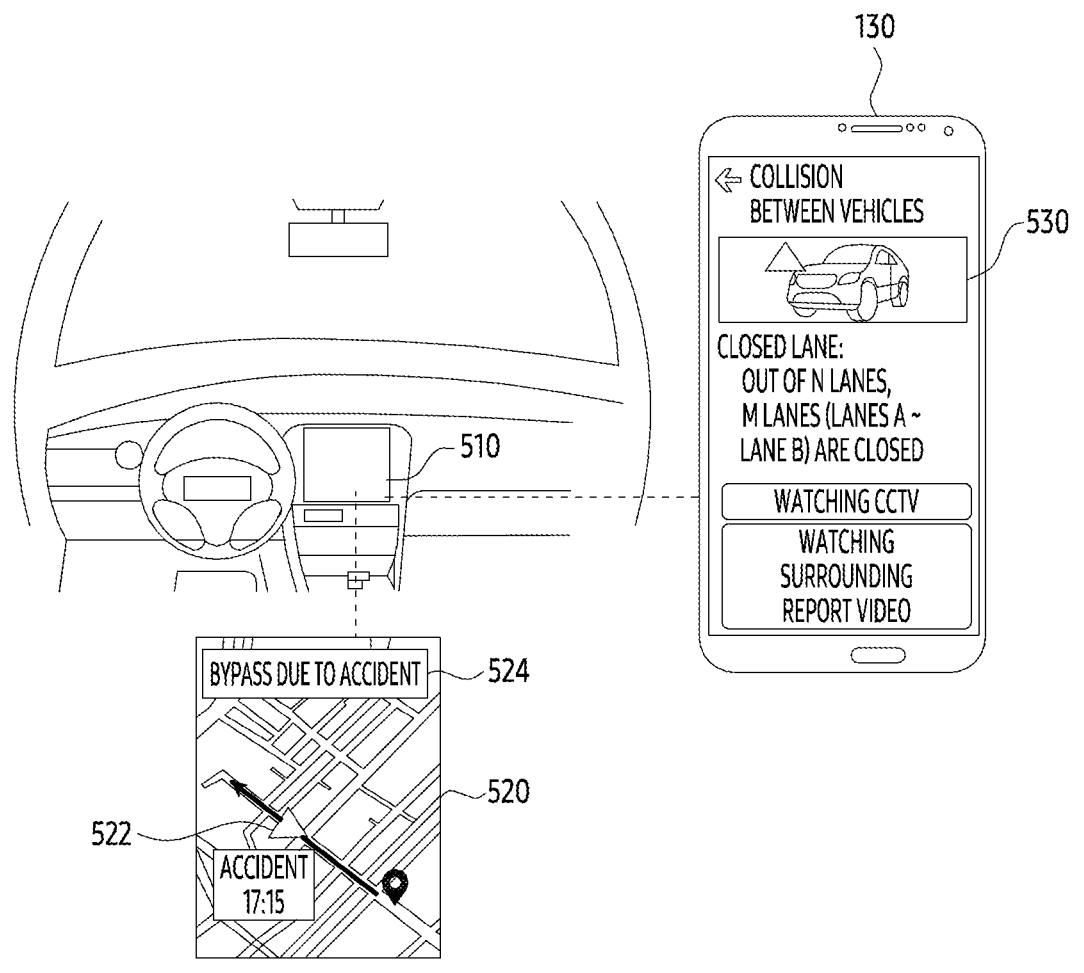
FIG. 5 is a diagram illustrating an example of a UI output by a terminal in response to information provided from an electronic device according to an embodiment.

FIG. 5 is a diagram illustrating an example of a UI output by the terminal 130 in response to information provided from an electronic device according to an embodiment. The electronic device may include the electronic device 101 of FIGS. 1 to 2. The terminal may include the terminal 130 of FIGS. 1 to 2. The UI of FIG. 5 may be displayed based on at least one of the operations of FIG. 4.

Referring to FIG. 5, an external display 510 connectable to the terminal 130 is illustrated. The external display 510 may include, for example, a display disposed in a vehicle. The external display 510 may correspond to the external display of FIG. 4.

Referring to FIG. 5, the terminal 130 may display a screen 520 based on a designated application such as a navigation application on the built-in display and/or the external display 510 of the terminal 130. For example, in a state in which the terminal 130 and the external display 510 are connected through a wired network and/or a wireless network, the terminal 130 may display the screen 520 on the external display 510. For another example, in a state in which the terminal 130 and the external display 510 are not connected, the terminal 130 may display the screen 520 in the built-in display.

In response to an accident occurring in a vehicle distinguished from the terminal 130 and/or the external display 510, as described in FIGS. 1 to 4, information related to the accident may be provided to the terminal 130. For example, a first external electronic device, such as vehicle image acquisition device disposed in a vehicle in which an accident has occurred, notifies the occurrence of the accident to an electronic device according to an embodiment and the electronic device may transmit information related to an accident that has occurred to the second external electronic device corresponding to the navigation server. The second external electronic device may transmit accident-related information to the terminal 130 adjacent to the location where the accident occurred and/or moving along a path overlapping the location.

In response to reception of the information, the terminal 130 may display accident-related information on the screen 520. For example, the terminal 130 may display a first visual element 522 notifying an accident. The first visual element 522 may correspond to the first visual element of the operations 140 and 450 of FIG. 4. Referring to FIG. 5, the first visual element 522 may have coordinates corresponding to a location where an accident has occurred in a map image on the screen 520, and may include information related to the accident (e.g., time when the accident has occurred. The terminal 130 may further display a message 524 notifying a change in a path according to the occurrence of an accident on the screen 520.

When the user touches and/or clicks the first visual element 522, the terminal 130 may further display a screen 530 including detailed information related to the accident. Referring to screen 530, terminal 130 may further display an accident type, a lane closed by an accident, a CCTV screen related to the accident, and/or a visual element related to a video reported by another user. Although an embodiment in which the terminal 130 displays the screen 530 on the built-in display is illustrated, the terminal 130 may display the screen 530 on at least a portion of the external display 510.

The electronic device according to various embodiments may process a video being streamed from a first external electronic device, such as a vehicle image acquisition device, based on a designated state (e.g., a traffic accident) identified by the first external electronic device. For example, when a notification related to a designated state is received from the first external electronic device, the electronic device may acquire information related to a designated state, and then broadcast the obtained information to one or more terminals (e.g., the terminal 130 of FIG. 5) through a second external electronic device such as a navigation server or an autonomous driving server. In response to the broadcasting, the terminal may provide information related to the designated state to the user of the terminal. The information may be used to change a navigation route or an autonomous driving route provided by the terminal.

As described above, the electronic device according to various embodiments may comprise a communication circuitry; and a memory storing a plurality of instructions; and at least one processor operably coupled to the communication circuitry and the memory wherein the plurality of instructions, when being executed by the at least one processor, cause the at least one processor to: receive, from a first external electronic device distinct from the electronic device, video by using the communication circuitry; receive, in a state that has received the video, a first signal notifying to enter a specified state, from the first external electronic device; in response to the reception of the first signal, identify information associated with the received video; and in response to the identification of the information, transmit, to a second external electronic device distinct from the first external electronic device, a second signal including at least portion of the information.

In an embodiment, the video may be transmitted from the first external electronic device to the electronic device, based on identifying, by a third external electronic device that is associated with the second external electronic device and is located in a vehicle comprising the first external electronic device, that an electronic map displayed on the third external electronic device does not correspond to the video obtained by the first external electronic device.

In an embodiment, the video may be transmitted from the first external electronic device to the electronic device based on identifying that an object recognized by the third external electronic device in the vehicle including the first external electronic device does not correspond to the object detected by the first external electronic device.

In an embodiment, the video may be transmitted from the first external electronic device to the electronic device, on a condition that a driving mode of a vehicle comprising the electronic device is changed from an autonomous driving mode to a manual driving mode.

In an embodiment, when being executed by the at least one processor, the plurality of instructions may control the at least one processor to store the video, based on the reception of the first signal; and discard the video after specified time elapses, based on the first signal not received. In an embodiment, a length of a time interval that maintains to store the video may be changed based on a type of the first signal.

In an embodiment, when being executed by the at least one processor, the plurality of instructions may control the at least one processor to identify the information associated with the video, by recognizing the video based on the first signal by rising a neural network.

In an embodiment, the second signal may cause the second external electronic device to identify one or more terminals associated with the at least portion of the information.

In an embodiment, the terminal according to various embodiments may comprise a built-in display, a communication circuitry; a memory storing a plurality of instructions; and at least one processor operably coupled to the built-in display, the communication circuitry, and the memory, wherein the plurality of instructions, when being executed by the at least one processor, cause the at least one processor to: communicate with a first external electronic device, based on a specified application; receive information associated with a second external electronic device distinct from the first external electronic device, from the first external electronic device; identify an external display distinct from the built-in display, in response to the reception of the information; display a first visual element associated with the information on the external display, in a first state in which the external display is connected to the terminal; display the first visual element, in a second state distinct from the first state; and in response to an identification of a user input associated with the first visual element in a state displaying the first visual element, a second visual element, associated with the first visual element, including at least portion of the information, and wherein the second visual element is displayed on the built-in display in the first state and is displayed on the external display in the second state.

In an embodiment, the first visual element may be displayed for providing information associated with an accident and displayed as superimposed on an electronic map provided via the specified application. In an embodiment, the first visual element may be displayed with a message for notifying the accident.

In an embodiment, the second visual element may include detail information regarding the accident indicated by the first visual element. In an embodiment, when being executed by the at least one processor, the plurality of instructions may control the at least one processor to cease to display the first visual element superimposed on the electronic map and display the second visual element, in response to the user input of the identification.

In an embodiment, the visual element is displayed as associated with information regarding time of occurrence of the accident.

Figure 6:
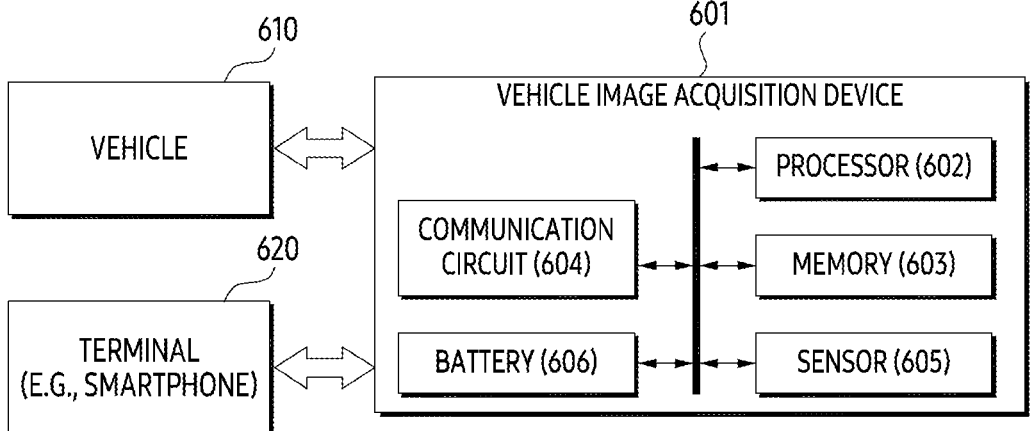
FIG. 6 is a block diagram of vehicle image acquisition device 601 according to various embodiments.

FIG. 6 is a block diagram of the vehicle image acquisition device 601 according to various embodiments. The vehicle image acquisition device 601 may include at least one of a processor 602, a memory 603, a communication circuit 604, a sensor 605, and a battery 606. The vehicle image acquisition device 601 may be connected to at least one of the vehicle 610 or the terminal 620 through a wired network and/or a wireless network. According to embodiments, the vehicle image acquisition device 601 and the terminal 620 may be integrally implemented. According to embodiments, the vehicle image acquisition device 601 and the vehicle 610 may be integrally implemented. According to embodiments, the vehicle image acquisition device 601, the vehicle 610, and the terminal 620 may be integrally implemented.

Hereinafter, a function performed by the vehicle image acquisition device 601 according to various embodiments will be described.

1. Battery Discharge Warning in Vehicle 610

The vehicle image acquisition device 601 operating while parking the vehicle 610 may reduce the average life of the battery in the vehicle 610, since power is provided to the vehicle image acquisition device 601 while the engine of the vehicle 610 is stopped. For example, when parking the vehicle 610 in which the generator in the vehicle 610 is turned off, the battery management system in the vehicle 610 may be difficult to obtain information on meaningful discharge characteristics (e.g., a change in at least one of voltage or current over time) of the battery in the vehicle 610 since there are few electronic devices in the vehicle 610 operating as a load. In other words, regarding parking of the vehicle 610, the battery management system in the vehicle 610 may be difficult to identify a time when the battery of the vehicle 610 needs to be replaced. Since the vehicle image acquisition device 601 consumes relatively large amount of power in a state where the generator in the vehicle 610 is turned off (e.g., while parking the vehicle 610) the vehicle image acquisition device 601 may monitor discharge characteristics of the battery of the vehicle 610. The vehicle image acquisition device 601 may obtain data on at least one of direct discharge characteristics (e.g., a change in at least one of voltage or current over time) or indirect discharge characteristics (e.g., a time when the voltage of the battery of the vehicle 610 drops to a specified voltage or a time when recording continues while parking the vehicle 610) by recording the result of the monitoring. The vehicle image acquisition device 601 may determine a time when the replacement of the battery of the vehicle 610 is required based on the obtained data. For example, the vehicle image acquisition device 601 may identify whether a time during parking of the vehicle 610 to be recorded is equal to or less than a reference time, and may determine a time when the battery needs to be replaced based on identifying that the time at which recording continues while parking the vehicle 610 is less than or equal to the reference time. As another example, the vehicle image acquisition device 601 may identify a trend of time at which recording continues while parking the vehicle 610. For example, the vehicle image acquisition apparatus 601 may identify whether a difference between a time when recording continues during the first parking of the vehicle 610 and a time when recording continues during the second parking of the vehicle 610 after the first parking is greater than a threshold, and determine when the battery needs to be replaced, based on identifying that the difference is greater than the threshold.

In an embodiment, in order to identify a time when recording continues while parking the vehicle 610, the timing of initiating acquiring an image through the vehicle image acquisition device 601 during parking may be a timing at which a voltage provided from the battery reaches a designated voltage. In an embodiment, the designated voltage may be changed according to a charging state of the battery. For example, under a condition in which the battery is completely charged, the designated voltage may be 12 (V) and the designated voltage may be 11.5 (V) under a condition in which the battery is not completely charged. However, it is not limited thereto.

The vehicle image acquisition device 601 according to an embodiment may monitor a moving average of a recording time while parking the vehicle 610 and warn that the state of health (SoH) of the battery of the vehicle 610 has expired when a decreasing slope exceeds a specific threshold. For example, deterioration of the performance of the battery of the vehicle 610 (e.g., expiration of the life of the battery of the vehicle 610) may reduce the capacity of the battery of the vehicle 610, and may reduce the recording time of the vehicle image acquisition device 601. In an embodiment, the specific threshold may be changed according to the designated voltage. For example, the constant threshold when the specified voltage is 12 (V) may be different from the constant threshold when the specified voltage is 11.5 (V). However, it is not limited thereto.

In an embodiment, when the moving average of the recording time is monitored using 601, the moving average of the recording performed through the vehicle image acquisition device 601 during the most recent parking of the vehicle 610 may be used as data for estimating how long the recording to be performed through the vehicle image acquisition device 601 during the next parking of the vehicle 610. Based on the data, the vehicle image acquisition device 601 may display an estimated value of a duration of recording to be performed through the vehicle image acquisition device 601 at the next parking of the vehicle 610 through at least one of a display in the vehicle 610, a display of the terminal 620, or a display of the vehicle image acquisition device 601. When an estimate of the duration of the recording is displayed through a display in the vehicle 610 or a display of the terminal 620, the vehicle image acquisition device 601 may transmit information for displaying an estimated value of the duration of the recording through the communication circuit 604. For example, the information may be transmitted from the vehicle image acquisition device 601 to the vehicle 610 or the terminal 620 in response to detecting that the engine of the vehicle 610 is driven. However, it is not limited thereto.

Meanwhile, the vehicle image acquisition device 601 may identify whether an estimate of the duration of the recording is less than a reference value. Based on identifying that the estimated value of the recording duration is less than the reference value, the vehicle image obtaining device 601 may execute an operation for providing a notification indicating that a replacement time of the battery of the vehicle 610 has arrived. For example, the vehicle image acquisition device 601 may output the notification through a speaker of the vehicle image acquisition device 601, or display the notification through the display of the vehicle image acquisition device 601. As another example, the vehicle image acquisition device 601 may transmit information for displaying the notification Or information for outputting the notification as a voice signal to at least one of the vehicle 610 or the terminal 620. At least one of the vehicle 610 and the terminal 620 may display or output the notification based on the information received from the vehicle image acquisition device 601.

In one embodiment, the vehicle image acquisition device 601 may record a duration of the recording until recording of the vehicle image acquisition device 601 is stopped while parking the vehicle 610 due to a low voltage of the battery in the vehicle 610 or a change trend in the voltage of the battery in the vehicle 610 from the start of the recording to the end of the recording. For example, in order to improve the accuracy of recording related to the performance of the battery in the vehicle 610, the vehicle image acquisition device 601 may store a previous charging time (a time when the engine of the vehicle is turned on) or a voltage at a time when recording of parking of the vehicle 610 starts. The vehicle image acquisition device 601 may process the stored record to extract the state of the battery in the vehicle 610 with respect to the recording-related time period (e.g., a recording time while parking the vehicle 610 or a time elapsed until the voltage of the battery of the vehicle 610 falls below a specified voltage). When the ratio exceeds the reference value by comparing the ratio of the extraction value (e.g., short-term extraction value) obtained during parking of the most recent vehicle 610 and the extraction value (e.g., long-term extraction value) for a specified period longer than recording time during parking, the vehicle image acquisition device 601 may determine or recognize that the performance of the battery of the vehicle 610 is deteriorated. When the ratio falls below the reference value and the extracted value increases significantly after the ratio falls below the reference value, the vehicle image acquisition device 601 may recognize that the battery of the vehicle 610 has been replaced.

In an embodiment, the vehicle image acquisition device 601 may transmit a long-term extraction value, a short-term extraction value, or a value indicating whether replacement of the battery in the vehicle 610 is required to the server directly using the communication circuit 604 or through the vehicle 610 or the terminal 620.

At least some of the operations of the vehicle image acquisition device 601 described in the present embodiment may be executed by the terminal 620, the vehicle 610, or an external server other than the vehicle image acquisition device 601.

In an embodiment, the vehicle image acquisition device 601 may identify whether the battery is replaced based on the change trend. For example, when the time for continuing to acquire an image using the vehicle image acquisition device 601 during parking is prolonged, the vehicle image acquisition device 601 may identify that the battery is replaced. However, it is not limited thereto.

2. Constant Recording Prohibition Mode (Incognito Mode)

The constant recording prohibition mode described below may refer to a mode in which only a partial image of at least one of a designated time interval around a inning in which an impact recognized to be related to an accident is detected while the vehicle 610, a designated time interval around the timing at which the rapid acceleration event of the vehicle 610 is detected or a designated time interval around a timing in which a sudden deceleration event of the vehicle 610 is detected is being driven is stored and a mode of discarding the remaining partial image excluding the partial image among the recorded images while the vehicle 610 is in operation. When the location in which the vehicle 610 is located is changed (e.g., when a movement between countries occurs), the vehicle image acquisition device 601 may inquire whether to activate the constant recording prohibition mode without a user input.

When the operation of the vehicle 610 according to an embodiment is completed, the vehicle image acquisition device 601 may ask the user whether to store or delete the recorded image while the vehicle 610 is in operation. For example, the vehicle image acquisition device 601 may display a message or output the message as a voice signal for inquiring whether to store or delete a recorded image while the vehicle 610 is in operation. Alternatively, the vehicle image acquisition device 601 may store only event images and not store constant recording images. In order to protect personal privacy, improve storage memory life or avoid specific national privacy regulations, the vehicle image acquisition device 601 may discard the recorded image without storing or inquire whether to store the recorded image.

The vehicle image acquisition apparatus 601 may store a data frame output from an image and a voice codec in the memory 603 for some time. In the memory 603, an image acquired through the vehicle image acquisition device 601 may be stored based on a first input first output (FIFO) structure that extracts an old data frame and stores a recent one. The vehicle image acquisition device 601 may obtain a data frame output from an image and a voice codec from the buffer, mix the data frame if necessary, and store the data frame in a file. Files different for each event type may be stored in different parts of the memory 603. The vehicle image acquisition device 601 may find the file in the SDCard and delete the file in a state in which the constant recording prohibition mode is activated when controlling to bypass a recording unit in which a file for constant recording is generated, or deleting a file for constant recording is selected by a user input in a post-recording deletion mode. The vehicle image acquisition apparatus 601 may output whether to use the constant recording prohibition mode. The vehicle image acquisition device 601 may further include an input device that receives input from a user whether to use the constant recording prohibition mode. An input inquiring whether to use the constant recording prohibition mode may be input through the vehicle image acquisition device 601, may be input through the vehicle 610, or may be input through the terminal 620.

At least some of the operations of the vehicle image acquisition device 601 described in the present embodiment may be executed by the terminal 620, the vehicle 610, or an external server other than the vehicle image acquisition device 601.

3. Low Power Parking Recording Due to Unnecessary Camera Off

Among the one or more cameras included in the vehicle image acquisition device 601, the current consumption may be reduced by turning off the camera adjacent to the wall in parking recording. The camera adjacent to the wall may be identified by using a vehicle 610 (or built into the camera) sensor (radar, ultrasonic) or through camera image recognition. For example, from the image before entering the parking mode, the vehicle image acquisition device 601 may distinguish the wall. In the 2ch vehicle image acquisition device 601 with a front and rear camera, by turning off one camera, it is possible to save 30-40% of current consumption, which makes it possible to take a long parking recording time.

The vehicle image acquisition apparatus 601 may recognize an image (photo) taken in the traveling direction of the vehicle just before parking or determine whether there is a wall within a specified distance from the exterior of the vehicle using data obtained from an ultrasonic sensor or a radar sensor in the vehicle 610. The vehicle image acquisition device 601 may determine whether there is a wall within a specified distance from the exterior of the vehicle by recognizing an image (photo) taken in the vehicle traveling direction just before parking or using data obtained from an ultrasonic sensor or a radar sensor in the vehicle 610. The vehicle image acquisition device 601 may recognize whether there is a flat obstacle close to a certain level or more in the vehicle moving direction just before parking by using an ultrasonic sensor or a radar sensor (of the vehicle). The vehicle image acquisition device 601 may cut off the power of the camera on the side determined by the recognition unit that there is a wall in the parking mode, and control not to store the image of the camera.

In an embodiment, the ultrasonic sensor in the vehicle 610 may be connected to the vehicle image acquisition device 601 through communication in the vehicle 610 (e.g., CAN communication, LIN communication, etc.). The vehicle image acquisition device 601 may receive a signal for indicating that an external object approaches the vehicle 610 from the ultrasonic sensor activated during parking of the vehicle 610 and drive a camera of the vehicle image acquisition device 601 for which power is cut off during parking of the vehicle 610 based on reception of the signal. Through such driving of the camera, the vehicle image acquisition device 601 may obtain an image of an accident caused while the power provided to the camera is cut off. Meanwhile, the ultrasonic sensor may be operatively coupled to the auxiliary processor of the vehicle 610. When the generator of the vehicle 610 is turned off the auxiliary processor may obtain low power from the battery of the vehicle 610, unlike a main processor in the vehicle 610 in which power provided from the battery of the vehicle 610 is blocked. Due to the use of the auxiliary processor, the amount of power consumed by the battery of the vehicle 610 may be reduced while the generator of the vehicle 610 is turned off. According to embodiments, when there are plurality of ultrasonic sensors connected to the auxiliary processor, the auxiliary processor may acquire information about the camera whose power is cut off from the vehicle image acquisition device 601, and based on the information, and identify at least one ultrasonic sensor related to a field of view (FOV) of the camera in which the power is blocked among the plurality of ultrasonic sensors, and activate only at least one identified ultrasonic sensor.

At least some of the operations of the vehicle image acquisition device 601 described in the present embodiment may be executed by the terminal 620, the vehicle 610, or an external server other than the vehicle image acquisition device 601.

4. Language, User Country, Local Time, Sync with Summer Time Smartphone of the Vehicle Image Acquisition Device 601

The vehicle image acquisition device 601 may accurately adjust an accident time in the vehicle image acquisition device through information received from the terminal 620 connected by tethering or BT. For example, the vehicle image acquisition device 601 may identify the presence or absence of summer time in a corresponding country or region, different from the time received through GPS.

For example, the vehicle image acquisition device 601 may receive data on at least one of a country in which the terminal 620 is currently located, a language of the country, a local time of the country (summer time applied), and a location of the terminal 620 and a moving speed of the terminal 620 (or the vehicle image acquisition device 601, the vehicle 610) or a moving direction (or heading) of the terminal 620 (or the vehicle image acquisition device 601, the vehicle 610). The vehicle image acquisition device 601 may configure header information of an image acquired through the vehicle image acquisition device 601 or change information used in the vehicle image acquisition device 601, based on the data. Meanwhile, one or more application programs may be stored for transmission of the terminal 620 to the vehicle image acquisition device 601.

This may be because, despite the use of vehicle image acquisition device 601 as evidence in an accident, the current vehicle image acquisition device only acquires the longitude and latitude according to GPS measurement and GMT period, but does not obtain data to calculate the local time of the place where the vehicle image acquisition device 601 is located. Meanwhile, when data on the moving speed of the terminal 620 and/or the moving direction (or heading) of the terminal 620 is obtained, the vehicle image acquisition device 601 may be connected to the terminal 620 or the vehicle 610.

At least some of the operations of the vehicle image acquisition device 601 described in the present embodiment may be executed by the terminal 620, the vehicle 610, or an external server other than the vehicle image acquisition device 601.

5. Important Parking Impact Notification (IMU Related)

The vehicle image acquisition device 601 may exclude the part caused by the impact of getting on and off from the parking warning notification, by detecting (occurrence in the longitudinal direction) the impact of getting on and off before and after entering the parking mode and changing to the constant mode due to the engine start-up, and notify the user of only a parking impact that is likely to the actual vehicle damage.

For example, when driving an engine of the parked vehicle 610, a general vehicle image acquisition device may provide one to three images obtained according to an impact of getting on and off. Such an image may extend a time for searching for at least one image including a scene causing damage to the vehicle among a plurality of images recorded during parking. The vehicle image acquisition device 601 may delete an image obtained according to an impact on the user's getting on and off through image analysis, or delete at least one of an image obtained in a specified time interval before and after a stopped timing (or Before and after the turn off timing) of the vehicle 610 or an image obtained during a designated time period before and after a driving start timing (or before and after start on timing). The vehicle image acquisition device 601 may prevent becoming an unnecessary image through such deletion and may reduce a search time for a meaningful image.

In an embodiment, the vehicle image acquisition device 601 may obtain data on a Normal vector perpendicular to the ground where the vehicle 610 is parked just before entering the parking mode through data indicating a gravity direction vector obtained through an acceleration sensor of the vehicle 610, the terminal 620, or the vehicle image acquisition device 601.

Meanwhile, the vehicle image acquisition device 601 may identify whether at least some of the sound signals related to the vehicle 610 acquired through the microphone of the vehicle 610, the terminal 620, or the vehicle image acquisition device 601 are related to the impact sound of the door of the vehicle 610.

For example, the vehicle image acquisition device 601 may identify whether the impact caused in the vehicle 610 being parked is an impact generated when the vehicle 610 is on and off based on at least one of the data on the Norm vector and identification data indicating that at least some of the sound signals are related to the impact sound of the door of the vehicle 610 and the time when the data for the Norm vector is acquired, the state of the vehicle 610, the state of the power of the vehicle 610 or the state of the power of the vehicle image acquisition device 601. In addition, the vehicle image acquisition apparatus 601 may provide data used for the identification (data about the Norm vector, the identification data, etc.) and information about a result of the identification to the neural network in order to improve the performance of identifying whether the shock caused in the parked vehicle 610 is an impact that occurred when getting on and off the parked vehicle 610. The neural network may learn using data used for the identification and information on a result of the identification. Through this learning, the vehicle image acquisition device 601 may improve the performance of the identification.

Meanwhile, the vehicle image acquisition device 601 may monitor whether at least some of the images acquired while the vehicle 610 is parked are selected by a user input for image reproduction. For example, for the monitoring, the vehicle image acquisition device 601 may execute at least one of the number of times of playing at least some of the images, whether at least some of the images are downloaded, whether at least some of the images are copied to the storage box, or the acquisition of a response result value far the validity of at least some of the images. The vehicle image acquisition device 601 may add data obtained based on the execution of the monitoring as a label to the result data of identifying whether the impact caused in the vehicle 610 being parked is an impact generated when getting on or off the parked vehicle 610. The label may be used to improve performance of identifying whether an impact caused in the parked vehicle 610 is an impact generated when the parked vehicle 610 gets on and off the parked vehicle 610. For example, the label may be referenced by the neural network.

At least some of the operations of the vehicle image acquisition device 601 described in the present embodiment may be executed by the terminal 620, the vehicle 610, or an external server other than the vehicle image acquisition device 601.

6. Parking Impact Direction Notification (IMU Related)

The vehicle image acquisition device 601 may display the largest impact direction among parking shocks in the front (windshield) direction of the vehicle image acquisition device 601 with LED. Alternatively, the vehicle image acquisition device 601 may output a parking impact direction and intensity using the terminal 620. For example, the vehicle image acquisition device 601 may operate the sensor 605 (e.g., an IMU sensor) above 1000 Hz. For example, the vehicle image acquisition device 601 may switch a frequency at which the sensor 605 operates between a first state operating in a range of 10-50 Hz and a second state operating in a range of 1000 Hz or higher. When the vehicle image acquisition device 601 informs the user of the impact direction before boarding the vehicle, the user may quickly check the damaged part of the vehicle before boarding.

In an embodiment, the vehicle image acquisition device 601 may obtain data on the Norm vector in the same or similar manner as the method described in the table of contents "5. Important parking impact notification (IMU-related)". Based on the assumption that the front camera of the vehicle image acquisition device 601 is looking at a direction approximated to the front of the vehicle 610, the vehicle image acquisition device 601 may calculate data on a unit vector for a front direction of the vehicle 610, which is parallel to the ground in which the vehicle 610 is parked and is a unit length, using the data for the Norm vector and the coordinate system of the acceleration sensor (a vehicle image acquisition device 601, a vehicle 610, or a terminal 620).

The vehicle image acquisition device 601 may determine a coordinate system based on the vehicle 610 when parking the vehicle 610 based on the data on the Normal vector and the unit vector in the front direction of the vehicle 610; and based on the determined coordinate system at least one value obtained through the acceleration sensor and a time at which the at least one value is obtained during parking of the vehicle 610 are processed, determine which direction the initial impact direction of the vehicle 610 is during parking. The vehicle image acquisition device 601 may record the determination result data during parking of the vehicle 610 and, based on the result data, determine the direction of the largest impact among a plurality of impacts caused during parking of the vehicle 610.

The vehicle image acquisition device 601 may provide information on the direction of the largest impact. For example, the vehicle image acquisition device 601 may display the information on a display (display of the vehicle 610, display of the vehicle image acquisition device 601, or display of the terminal 620) related to the vehicle image acquisition device 601. As another example, the vehicle image acquisition device 601 may output the information as a voice signal through a speaker related to the vehicle image acquisition device 601. However, it is not limited thereto.

Some of the operations of the vehicle image acquisition device 601 described in the present embodiment may be executed by the terminal 620, the vehicle 610, or an external server other than the vehicle image acquisition apparatus 601.

7. Towing Notification (IMU Related)

Unlike a simple impact, since the angle of the parked vehicle changes from the initial start of the towing, the vehicle image acquisition device 601 may detect and notify the changed angle of the parked vehicle. For example, the vehicle image acquisition device 601 may be executed in the same or similar manner as the method described in the description of the table of contents "6. Parking impact direction notification (IMU-related)". Through this execution, the vehicle image acquisition device 601 may distinguish between an impact event while parking the vehicle 610 and a towing event of the vehicle 610, unlike a general vehicle image acquisition device.

At least some of the operations of the vehicle image acquisition device 601 described in the present embodiment may be executed by the terminal 620, the vehicle 610, or an external server other than the vehicle image acquisition device 601.

8. Remaining Passenger Notification

When the vehicle image acquisition device 601 includes an indoor camera, the vehicle image acquisition device 601 may detect indoor movement during parking and notify the vehicle owner. For example, indoor movement by children and pets can be detected. A method of checking whether there is movement indoors may include, for example, a method of checking whether there is a motion vector in the vehicle, and/or a method of checking through recognition. In this case, it may be more efficient in terms of cost than using ultrasonic waves, radar, and UWB (usually millimeter waves). The vehicle image acquisition device 601 may transmit a picture related to indoor movement using a connected service based on the communication circuit 604.

In an embodiment, the vehicle image acquisition apparatus 601 may obtain an image inside the vehicle 610 using an indoor camera (a camera of the vehicle image acquisition apparatus 601, a camera of the vehicle 610, and/or a camera of the terminal 6203 of the vehicle 610 related to the vehicle image acquisition apparatus 601. The vehicle image acquisition device 601 may analyze the image. The vehicle image acquisition device 601 may detect motion in the obtained image. The vehicle image acquisition device 601 may determine whether the detected motion is caused by a shadow. The vehicle image acquisition device 601 may exclude a partial image corresponding to an area in which a window of the vehicle 610 from the obtained image.

The vehicle image acquisition device 601 may obtain a sound signal in the vehicle 610 through a microphone related to the vehicle image acquisition device 601 while obtaining the image. The vehicle image acquisition device 601 may analyze the generation time of the sound signal, the intensity of the sound signal and the type of the sound signal.

The vehicle image acquisition device 601 may determine whether there is an object moving indoors during parking of the vehicle 610 based on at least one of the image obtained during parking excluding the partial image, data on the detected motion, result data of analysis of the image, or data on the sound signal. As necessary, the vehicle image acquisition device 601 may transmit information on the determination result to an electronic device (e.g., the vehicle 610, the terminal 620, or an external server) related to the vehicle image acquisition device 601.

As described above, the vehicle image acquisition device 601 may distinguish and determine the indoor movement of the vehicle 610 from shadows or lights using a motion vector and image analysis. In addition, the vehicle image acquisition device 601 may improve the accuracy of the determination by further using the obtained sound signal.

At least some of the operations of the vehicle image acquisition apparatus 601 described in the present embodiment may be executed by the terminal 620, the vehicle 610, or an external server other than the vehicle image acquisition apparatus 601.

9. Low Voltage Automatic Start-Up Charging

When the voltage of the battery of the vehicle 610 falls below a specific value, the vehicle image acquisition apparatus 601 may start up the vehicle 610 with reference to the fuel gauge or only for a specified number of times. The vehicle image acquisition apparatus 601 may charge the battery of the vehicle 610 for a specified time (e.g., 30 minutes to 1 hour), extend a parking recording cycle, and prevent the battery discharging of the vehicle 610.

Hereinafter, one or more functions performed by the vehicle image acquisition apparatus 601 according to an embodiment by communicating with the vehicle 610 and/or the terminal 620 will be described.

1. Update Traffic Information Using Photo Information

When the ratio of the own vehicle's average speed (GPS or vehicle speed) and the current average speed on the received real-time traffic information exceeds a certain range from 1 (Equation: I1-Own vehicle average speed/Real-time traffic information speed I>Threshold), the vehicle image acquisition device 601 may update the server's traffic information or map by sending one or more photos (taken at regular time intervals) to the server and determining whether the road situation is accident, congestion, incident (construction cone), etc.

2.

The vehicle image acquisition device 601 may obtain a linear acceleration (acceleration excluding gravity) of the vehicle and a direction in which gravity acts by processing the IMU sensor data based on the vehicle speed (or GPS speed) (through calibration, by converting the sensor coordinate system to the vehicle coordinate system). The vehicle image acquisition device 601 may determine a road inclination ratio, a porthole, a speed bump, an amount of horizontal acceleration on the left and right, and an evenness of the road surface based on the direction of gravity and the acceleration value in the direction of travel obtained as the secondary rate of change of the vehicle speed. This may be information unknown from GPS. The vehicle image acquisition device 601 may detect sudden braking (e.g., 0.3 g or more), FCW per hour, LDW ratio, and a safe distance from the vehicle in front. The vehicle image acquisition device 601 may accurately search and guide by identifying the road surface, knowing a junction or whether ramp is entered. The vehicle image acquisition device 601 may also update a map.

3. Warning for Pedestrians in Child Protection Areas

The vehicle image acquisition device 601 may recognize a pedestrian behind a hidden object (stopped vehicle, etc.) through a camera installed in front of the driver's point of view (radiator grille, front bumper, hood front) and output a caution warning. For example, the vehicle image acquisition device 601 may effectively recognize pedestrians and children based on face recognition. The vehicle image acquisition apparatus 601 may identify the distance between the vehicle and the pedestrian by calculating the rate of change over time of the face size (transverse pixel length or longitudinal pixel length). For example, when a face having a size greater than or equal to a certain pixel is identified, the vehicle image acquisition device 601 may notify the driver of the traffic accident risk.

The traffic accident emergency notification system (NG e-Call, Next Generation e-Call) that enables two-way VoIP voice calls and two-way data transmission of more than 200 bytes using telecommunication-based IP network environments such as LTE/5G may refer to a driver rescue system through emergency notification in the event of a traffic accident such as a car collision.

The traffic accident emergency notification system (NG e-Call IVS, NG e-Call In-Vehicle System) terminal may refer to a device that is installed directly inside a vehicle during the manufacturing stage of a finished vehicle; and capable of automatically determining an accident by its own algorithm by receiving various information necessary for accident analysis from sensors of the vehicle or the terminal or transmitting minimum accident information and extended accident information data through the occurrence of a manual trigger and performing voice communication with the emergency rescue center.

The e-Call Center may refer to a center that finally determines whether an accident has occurred by receiving minimum accident information, extended information, and still image information from the traffic accident emergency notification system terminal; and a center that delivers additional information such as rescue requests and injury severity to secondary related organizations such as fire stations, police, hospitals, and traffic control centers.

In the event of an accident, Minimum Set of Data (MSD) may mean minimum information including basic accident information transmitted by the traffic accident emergency notification system terminal of a traffic accident to the traffic accident emergency notification reception center.

Extended Set of Data (ESD) refers to 30 points (20 points before the accident and 10 points after the accident, e.g., 20 seconds before the accident and 10 seconds after the accident) of information transmitted by the traffic accident emergency notification system terminal to the traffic accident emergency notification reception center for accurate accident judgment and injury severity analysis, and may include information directly related to the accident and additional information.

FIG. 7 is a diagram illustrating a data structure of Minimum Set of Data MSD generated by an electronic device according to an embodiment.

The Minimum Set of Data (MSD) may be the first information transmitted from the traffic accident emergency notification system terminal to the traffic accident emergency notification reception center through automatic triggers or manual operation of the driver's SOS button in the event of a vehicle accident or emergency. The MSD is a message including accident occurrence fact delivery and accident location information, and is classified into essential information and selection information according to the importance of the information.

MSD is a data message that quickly transmits basic accident information to the traffic accident emergency notification reception center so that rapid accident notification and emergency rescue response can be made and essential information among MSD refers to information such as the time of occurrence of an accident and the location of the accident vehicle that must be included in the MSD. The selection information refers to other information selectively transmitted when it is possible to collect in the traffic accident emergency notification system terminal.

The data arrangement order of MSD may be based on the data structure of MSD set in the EU 15722:2015 standard to maintain data compatibility with the European Standard. Encoding of MSD may be based on the ASN.1 UPER scheme.

Referring to FIG. 7, recentVehicleLocationN1 and recentVehicleLocationN2 referenced in sequence numbers 9 to 10 may be information recorded as mandatory (M). The information is information for indicating a location where an accident has occurred, and may be essentially recorded to estimate the location of the accident despite the GPS hearing loss area.

In an embodiment, the MSD may further include data on the timing of measuring the vehicle location of sequence 7 and data on the timing of measuring the vehicle direction of sequence 8. In an embodiment, the data on the timing of measuring the vehicle location of sequence 7 may indicate a difference between the timing indicated by timestamp of sequence 6 and the timing of measuring the vehicle location of sequence 7. In an embodiment, the data on the timing of measuring the vehicle direction of sequence 8 may indicate a difference between the timing indicated by timestamp sequence 6 and the timing of measuring the vehicle direction of sequence 8. In one embodiment, MSD may further include data on the timing at which the recentVehicleLocationN1 and the recentVehicleLocationN2 of sequence 9 and 10 are measured. The data may be data distinguished from timestamp of sequence 6. The data may be recorded in a separate field in MSD or in a field for additional data of sequence 12.

FIG. 8 is a diagram illustrating a data type, a constraint, and a definition of information (Vehicle Identification Number) referred to as sequence number 4 of FIG. 7. The information may include a unique identifier of a vehicle defined as ISO 3779:2009 Road vehicles, as well as a number of a vehicle registration plate prescribed by laws and regulations of a country related to the vehicle. For example, in the case of the Republic of Korea, a vehicle number based on a notice on standards such as a vehicle registration number plate may be included in the information.

As vehicle identifiers based on laws and regulations are further included, MSD may be related to products for AM. As MSD is related to the AM product, the number of vehicles to which MSD is applicable may increase, and MSD may be widely used for rescue. MSD generated by the electronic device according to an embodiment may be compatible with the ITU NG eCall.

The Minimum Set of Data (hereinafter, MSD) defined through the description of FIG. 7 or 8 may be utilized as follows. For example, the electronic device included in the vehicle may detect that an accident of the vehicle occurs. For example, the electronic device may be a device embedded in the vehicle. As another example, the electronic device may be a device detachably attached to the vehicle. However, it is not limited thereto.

In an embodiment, the detection of the occurrence of the accident of the vehicle may be executed based on information on values received from at least one sensor in the vehicle. For example, the electronic device may detect the occurrence of the accident of the vehicle by identifying the occurrence of the accident of the vehicle based on the information. In another embodiment, the detection of occurrence of the accident of the vehicle may be performed based on a message for instructing identification of the occurrence of the accident of the vehicle from another electronic device embedded in the vehicle. However, it is not limited thereto.

The electronic device may transmit the MSD to a server related to an automotive emergency service in response to or based on the detection. The server may receive the MSD from the electronic device. In response to reception of the MSD, the server may identify that the MSD is related to an accident of the vehicle, and may drive a timer for confirming that the MSD is related to the accident of the vehicle. In addition, in response to the reception of the MSD, the server may transmit an Ack (acknowledgement) message for indicating that the MSD is received to the electronic device.

The electronic device may drive a timer for determining that the MSD is related to the accident of the vehicle in response to reception of the Ack message. The electronic device may output a guide voice or display a visual guide to determine that the electronic device is related to an accident of the vehicle while driving the timer. When the electronic device does not receive the guide voice or a response to the visual guide from the user until the driving of the timer expires, the electronic device may transmit a message to indicate to the server that it is related to the accident of the vehicle.

Meanwhile, the server may identify whether the message is received until the operation of the tinier of the server expires, and transmit the MSD to another server connected to the server based on the identifying that the message is not received until the operation of the timer of the server expires. The MSD transmitted from the server to the other server may be used to provide a rescue service for the occurrence of the accident of the vehicle. For example, the other server receiving the MSD may send a call or transmit a message to a public safety agent using the MSD. However, it is not limited thereto.

Figure 9:
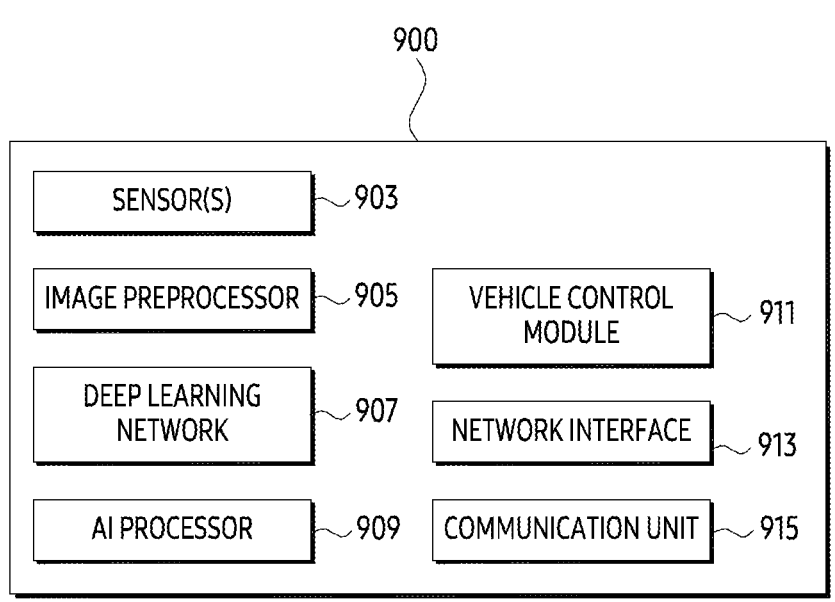
FIG. 9 is a block diagram illustrating an autonomous driving system of a vehicle according to an embodiment.

FIG. 9 is a block diagram illustrating an autonomous driving system 900 of a vehicle according to an embodiment.

The autonomous driving system 900 of the vehicle according to FIG. 9 may be a deep learning network including sensors 903, an image preprocessor 905, a deep learning network 907, an artificial intelligence (AI) processor 909, a vehicle control module 911, a network interface 913, and a communication unit 915. In various embodiments, each element may be connected through various interfaces. For example, sensor data sensed and output by the sensors 903 may be fed to the image preprocessor 905. The sensor data processed by the image preprocessor 905 may be fed to the deep learning network 907 executed by the AI processor 909. The output of the deep learning network 907 executed by the AI processor 909 may be fed to the vehicle control module 911. Intermediate results of the deep learning network 907 executed by the AI processor 907 may be fed to the AI processor 909. In various embodiments, the network interface 913 transmits autonomous driving route information and/or autonomous driving control commands for autonomous driving of the vehicle to internal block configurations by performing communication with the electronic device 101. In an embodiment, the network interface 913 may be used to transmit sensor data obtained through the sensor(s) 903 to the second external electronic device 120. In some embodiments, autonomous driving control system 900 may include additional or fewer components as appropriate. For example, in some embodiments, the image preprocessor 905 may be an optional component. For another example, the post-processing component (not shown in FIG. 9) may be included in the autonomous driving control system 900 to perform post-processing in the output of the deep learning network 907 before the output is provided to the vehicle control module 911.

In some embodiments, sensors 903 may include one or more sensors. In various embodiments, sensors 903 may be attached to different locations of the vehicle. Sensors 903 may face one or more different directions. For example, the sensors 903 may be directed toward the front, sides, rear and/or loop of the vehicle to face forward-facing, rear-facing, side-facing, etc. directions. In some embodiments, sensors 903 may be image sensors such as high dynamic range cameras. In some embodiments, sensors 903 include non-visual sensors. In some embodiments, sensors 903 include RADAR, light detection and ranging (LiDAR), and/or ultrasonic sensors in addition to the image sensor. In some embodiments, the sensors 903 are not mounted on a vehicle having the vehicle control module 911. For example, sensors 903 are included as part of a deep learning system for capturing sensor data and may be attached to the environment or road and/or mounted on surrounding vehicles.

In some embodiments, the image pre-processor 905 may be used to preprocess sensor data of sensors 903. For example, image preprocessor 905 may be used to preprocess sensor data, to split sensor data into one or more components, and/or to post-process one or more components. In some embodiments, the image preprocessor 905 may be a graphics processing unit (GPU), a central processing unit (CPU), an image signal processor, or a specialized image processor (GPP). In various embodiments, the image preprocessor 905 may be a tone-mapper processor for processing high dynamic range data. In some embodiments, the image preprocessor 1505 may be a component of the AI processor 909.

In some embodiments, a deep learning network 907 may be a deep learning network for implementing control commands for controlling an autonomous vehicle. For example, the deep learning network 907 may be an artificial neural network such as a convolutional neural network (CNN) trained using sensor data, and the output of the deep learning network 907 is provided to the vehicle control module 911.

In some embodiments, the artificial intelligence (AI) processor 909 may be a hardware processor for running the deep learning network 907. In some embodiments, AI processor 909 is a specialized AI processor for performing inference over convolutional neural networks (CNNs) on sensor data. In some embodiments, the AI processor 909 may be obtained for a bit depth of sensor data. In some embodiments, processor 909 may be optimized for deep learning operations such as operations of a neural network including convolution, inner, vector and/or matrix operations. In some embodiments, the AI processor 909 may be implemented through a plurality of graphic processing units (GPUs) that can effectively perform parallel processing.

While the AI processor 909 is executed, the AI processor 909, in various embodiments, may perform deep learning analysis on sensor data received from the sensor(s) 903 and be coupled through an input/output interface to a memory configured to provide an AI processor with instructions that cause determining the machine learning result used to operate the vehicle at least partially autonomously. In some embodiments, the vehicle control module 911 may be used to process commands for vehicle control output from the artificial intelligence (AI) processor 1509 and translate the output of the AI processor 909 into instructions for controlling the module of each vehicle to control various modules of the vehicle. In some embodiments, the vehicle control module 911 is used to control a vehicle for autonomous driving. In some embodiments, the vehicle control module 911 may adjust the steering and/or speed of the vehicle. For example, the vehicle control module 911 may be used to control driving of a vehicle such as deceleration, acceleration, steering, lane change, and lane keeping. In some embodiments, the vehicle control module 911 may generate control signals for controlling vehicle lighting, such as brake lights, turns signals, and headlights. In some embodiments, the vehicle control module 911 may be used to control vehicle audio-related systems such as vehicles sound system, vehicle's audio warning, vehicle's microphone system, vehicle's horn system, and the like.

In some configurations, vehicle control module 911 may be used to control notification systems including warning systems for notifying passengers and/or drivers of driving events such as access to the intended destination or potential collision. In some embodiments, the vehicle control module 911 may be used to adjust sensors such as sensors 903 of the vehicle. For example, the vehicle control module 911 may modify the orientation direction of the sensors 903 and change output resolution and/or format type of sensors 903, increase or decrease capture rate, adjust dynamic range and the focus of the camera. In addition, the vehicle control module 911 may individually or collectively turn on/off the operations of the sensors.

In some embodiments, vehicle control module 911 may be used to change parameters of image preprocessor 905 in such a way as modifying the frequency range of filters or adjusting features and/or edge detection parameters for object detection, or adjusting channels and bit depths. In various embodiments, the vehicle control module 911 may be used to control autonomous driving and/or driver assistance functions of the vehicle.

In some embodiments, the network interface 913 may serve as an internal interface between the block configurations of the autonomous driving control system 900 and the communication unit 915. Specifically, the network interface 913 may be a communication interface for receiving and/or transmitting data including voice data. In various embodiments, the network interface 913 may be connected to external servers to connect voice calls, receive and/or send text messages, transmit sensor data, or update the vehicle's software to an autonomous driving system and update software of the autonomous driving system of the vehicle through the communication unit 915.

In various embodiments, the communication unit 915 may include various wireless interfaces of a cellular or WiFi. For example, the network interface 913 may be used to receive updates on operating parameters and/or instructions for sensors 903, image preprocessor 905, deep learning network 907, AI processor 909, and vehicle control module 911 from the second external electronic device 120 connected through communication unit 915. For example, the machine learning model of the deep learning network 907 may be updated using the communication unit 915. According to another example, the communication unit 915 may be used to update operating parameters of the image preprocessor 905 such as image processing parameters and/or firmware of the sensors 903.

In another embodiment, communication unit 915 may be used to activate communication for emergency services and emergency contact in an accident or a near-accident event. For example, in a collision event, communication unit 915 may be used to call emergency services for assistance, and may be used to inform the outside of the collision details and the location of the vehicle for emergency services. In various embodiments, the communication unit 915 may update or obtain the expected arrival time and/or destination location.

According to an embodiment, the autonomous driving system 900 illustrated in FIG. 9 may be configured as an electronic device of a vehicle. According to an embodiment, when an autonomous driving release event occurs from a user during autonomous driving of a vehicle, the AI processor 909 of the autonomous driving system 900 may control the autonomous driving software of the vehicle to be learned by controlling to input information related to the autonomous driving release event into training set data of the deep learning network.

Figure 10:
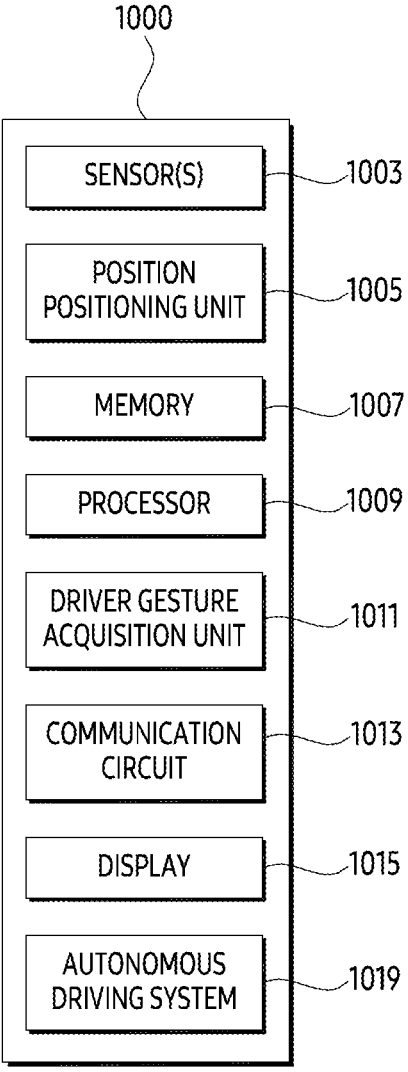
FIG. 10 is a block diagram of an electronic device according to an embodiment.

FIG. 10 is a block diagram of an electronic device 1000 according to an embodiment.

Referring to FIG. 10, an electronic device 1000 according to an embodiment may include at least one of sensors 1003, a position positioning unit 1005, a memory 1007, a processor 1009, a driver gesture acquisition unit 1011, a communication circuit 1013, a display unit 1015, and an autonomous driving system 1017. In various embodiments, each element may be connected through various interfaces. In some embodiments, the electronic device 1000 may include additional or fewer components as appropriate. For example, the sensor(s) 1003 may be a component of an external device separate from the electronic device 1000. In some embodiments, sensors 903 include RADAR, light detection and ranging (LiDAR), and/or ultrasonic sensors in addition to the image sensor.

The position positioning unit 1005 may position the vehicle in real time through a global positioning system (GPS), a global navigation satellite system (GNSS) such as GLONASS, or communication with a base station of a cellular network, and provide the positioned position to the processor 1009.

The memory 1007 may store at least one of various control information for driving a vehicle, driving information generated according to driving of the vehicle, operating system software of the vehicle, and electronic map data for driving the vehicle.

Processor 1009 may include hardware components for processing data based on one or more instructions. In an embodiment, the processor 1009 may transmit autonomous driving disengagement event associated information to the server through the communication circuit 1013 on a condition that satisfies a specified criterion.

In an embodiment, the processor 1009 may store sensor data and location information obtained by the sensor(s) 1003 during autonomous driving of the vehicle in the memory 1007.

In an embodiment, the autonomous driving disengagement event associated information includes at least one of sensor data obtained by sensor(s) 1003 at the time when the autonomous driving release event occurs, location information from which the sensor data is acquired, and driver driving information. In an embodiment, the sensor data may include at least one of image sensors, radar, LiDAR and data obtained by ultrasonic sensors. In an embodiment, autonomous driving disengagement event associated information may be processed independently of driver identification information (User ID, Driver license information, driver name, etc.) and/or vehicle identification information (License plate information, Vehicle Identification Number) that may identify the driver in order to protect the driver's privacy.

In an embodiment, the designated criterion may be a time point at which an autonomous driving disengagement event occurs. For example, it may be a time when a driver intervention occurs while the vehicle is driving in the autonomous driving mode or a driver gesture requesting to change the driving mode from the autonomous driving mode to the manual driving mode occurs. In an embodiment, the driver's intervention may be determined based on identifying that the driver operates the steering wheel of the vehicle or the accelerator pedal/decelerator pedal of the vehicle, the gear of the vehicle by the driver gesture obtain unit 1011. In an embodiment, the driver gesture acquisition unit 1011 may determine the driver's intervention based on identifying the driver's hand motion or body motion indicating the conversion of the driving mode from the autonomous driving mode to the manual driving mode. In an embodiment, the autonomous driving disengagement event may occur at a point where the autonomous driving system 1017 of the vehicle fails to smoothly autonomously drive according to a pre-trained autonomous driving algorithm. For example, the driver gesture acquisition unit 1011 may determine driver intervention for changing the mode to the autonomous driving release mode by the driver gesture generated at the time identified by the processor 1009, when a vehicle traveling on a predetermined driving route according to an autonomous driving mode enters a roundabout without a traffic light, based on detecting the presence of another vehicle entering the roundabout, and the processor 1009 identifying that the other vehicle does not proceed in the predicted direction and speed. In another example, based on the processor 1009 identifying unexpected road conditions (during road construction), traffic conditions, road accidents, and vehicle failure notification of a vehicle driving on a set driving route according to an autonomous driving mode, the driver gesture obtain unit 1011 may determine driver intervention for changing a mode to the autonomous driving release mode by a driver gesture generated at a time point identified by the processor 1009.

In an embodiment, the driver gesture obtain unit 1011 may determine whether the user gesture recognized through the visible light camera and/or infrared camera mounted inside the vehicle is a gesture corresponding to the release of a predetermined autonomous driving mode. In addition, in an embodiment, the driver gesture obtain unit 1011 may identify occurrence of an autonomous driving release event by a user input selected through a user experience (UX) displayed on the display 1013.

In an embodiment, the processor 1009 may acquire driver driving information on a condition that satisfies a specified criterion, and transmit the obtained driving information and the obtained location information to the server 1100 through the communication circuit 1013. In this case, the driver driving information may include at least one of a steering wheel operation angle manipulated by the driver, accelerator pedal operation information, decelerator pedal operation information, gear information at the time when the autonomous driving release event occurs.

In an embodiment, the processor 1009 may transmit only some of the data obtained by the sensor(s) 1003 to the autonomous driving disengagement event aggregated information when autonomous driving disengagement event aggregated information obtained at the time of autonomous driving disengagement event occurrence to reduce congestion of reverse traffic.

For example, when a total of 10 sensors are installed in the vehicle, and each sensor acquires sensor data at 30 frames per second (30 fps), the processor 1009 may transmit only some frames (100 frames) (10 seconds×10 frames) out of a total of 300 frames (10 seconds×30 frames) generated for a specific time (e.g., 10 seconds), based on the time when the autonomous driving release event occurs, among sensor data obtained from the 10 sensors to the server.

In another embodiment, when transmitting autonomous driving disengagement event associated information obtained at the time the autonomous driving disengagement event occurs to the server, the processor 1009 may transmit full data of the data acquired by the sensor(s) 1003 as transmitting autonomous driving disengagement event associated information. For example, when a total of 10 sensors are installed in the vehicle, and each sensor acquires sensor data at 30 frames per second (30 fps), the processor 1009 may store only some of the sensor data (10 frames per second) obtained from the 10 sensors in the memory 1007 and transmit the entire 300 frames (10 seconds×30 frames) generated for a specific time (e.g., 10 seconds), based on the time when the autonomous driving disengagement event occurs to the server.

Of course, it is natural that the processor 1009 matches the time synchronization of sensor data obtained from each sensor 1003. The autonomous driving system 1017, according to an embodiment, may provide an autonomous driving function to the vehicle using a neural network learned using sensor data acquired by the sensor(s) or update or download autonomous driving software in an Over The Air (OTA) manner through the communication circuit 1013.

Figure 11:
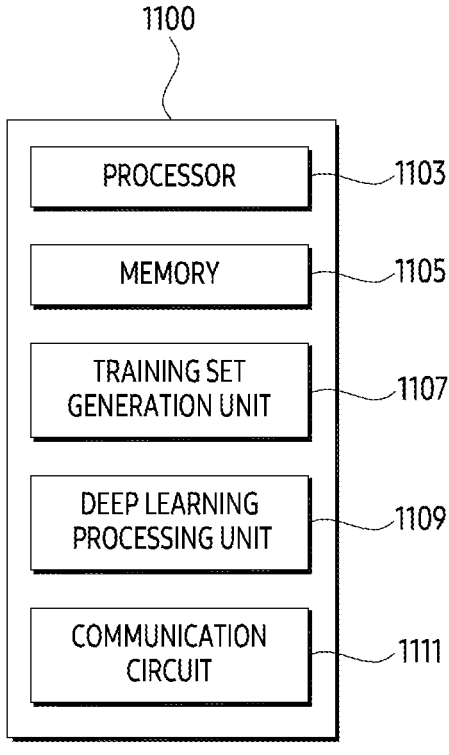
FIG. 11 is a block diagram of a server according to an embodiment.

FIG. 11 is a block diagram of a server 1100 according to an embodiment.

Referring to FIG. 11, the server 1100 according to an embodiment may include at least one of a processor 1103, a memory 1105, a training set generation unit 1107, a deep learning processing unit 1109, and a communication circuit 1111. In various embodiments, each element may be connected through various interfaces. In some embodiments, server 1100 may include additional or fewer components as appropriate.

In an embodiment, the processor 1103 distributes the software (algorithm) for learned autonomous driving by the deep learning processing unit 1109 to the electronic device 1000 in an OTA method through the communication circuit 1111. In an embodiment, the processor 1103 transmits information related to the autonomous driving release event received from the electronic device 1000 to the training set generation unit 1107 and controls the generation of training data for learning of the deep learning processing unit 1109.

In an embodiment, the memory 1105 stores electronic map data, sensor data obtained from vehicles connected to a network and performing autonomous driving, and location information required for autonomous driving of the vehicle regardless of identification information of the user and/or the vehicle.

According to an embodiment, the memory 1105 may store only sensor data and location information generated when an autonomous driving disengagement event occurs during autonomous driving of the vehicle.

In an embodiment, the deep learning processing unit 1109 performs deep learning algorithm learning of autonomous driving using the training data generated by the training set generating unit 1107, and updates the autonomous driving algorithm using the performed learning result.

In an embodiment, the processor 1103 may distribute the autonomous driving algorithm updated by the deep learning processing unit 1109 to the electronic device 1000 connected to the network through an OTA method.

According to an embodiment, the processor 1103 is an autonomous driving control system of the vehicle B passing through a location where information related to the autonomous driving release event received from the vehicle A through the communication circuit 1111 is generated and require updating the autonomous driving software; and vehicle B may download the updated autonomous driving software.

Figure 12:
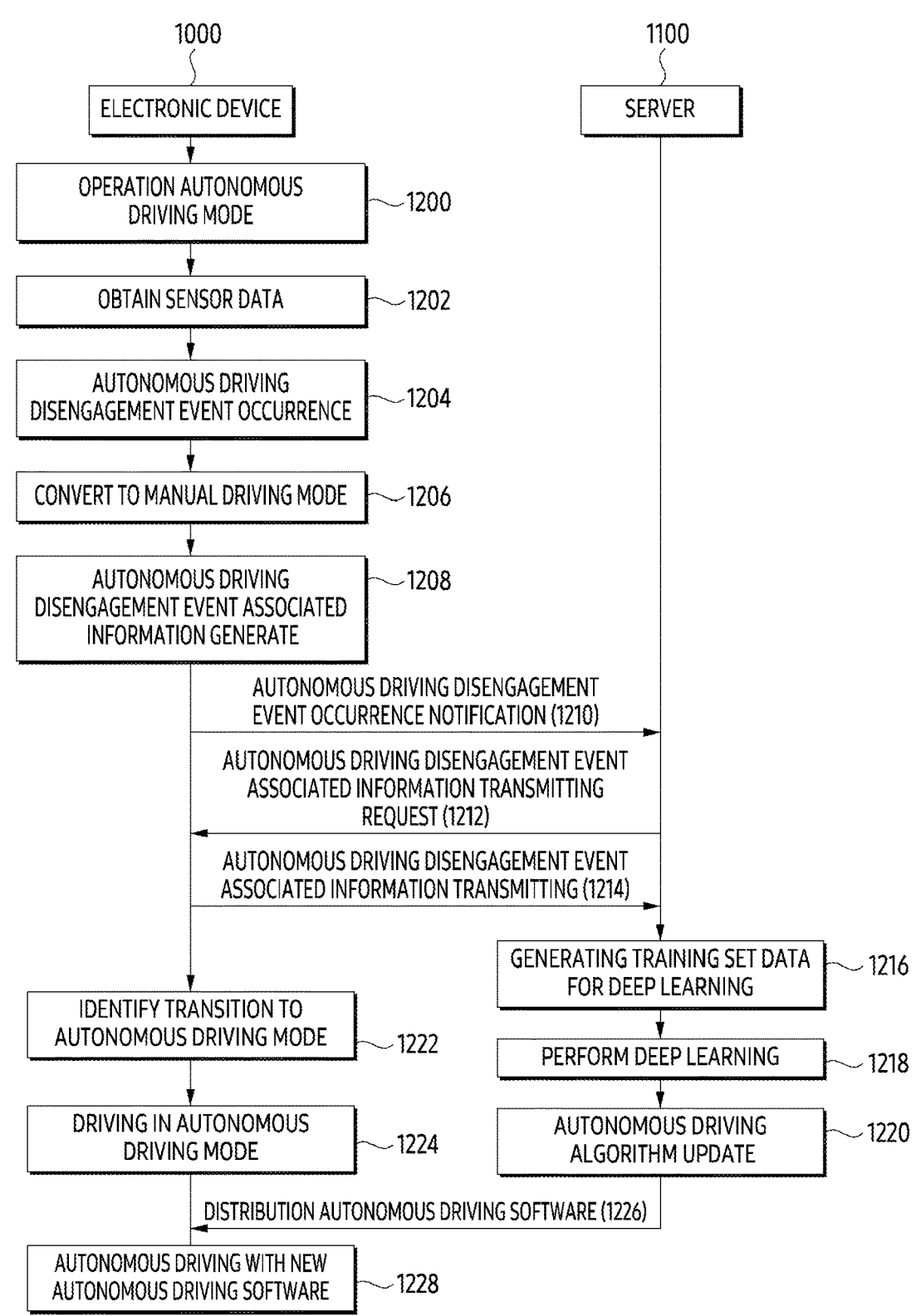
FIG. 12 is a signal flowchart illustrating an operation of an electronic device according to various embodiments.

FIG. 12 is a signal flowchart illustrating an operation of an electronic device according to various embodiments.

Referring to FIG. 12, in operation 1200, the electronic device 1000 according to an embodiment operates in an autonomous driving mode, and obtains sensor data by sensor(s) in operation 1202. In operation 1204, when an autonomous driving disengagement event occurs, the electronic device 1000 according to an embodiment converts the autonomous driving mode into a manual driving mode and performs driving according to a control command generated by a user's manual operation.

In operation 1206, the electronic device 1000 according to an embodiment generates information related to the autonomous driving disengagement event, and transmits the autonomous driving disengagement event occurrence notification message to the server 1100 in operation 1210.

In response to obtaining the autonomous driving disengagement event occurrence notification message, in operation 1212, the server 1100 transmits an information transmission request message related to the autonomous driving disengagement event to the electronic device 1000.

In response to the acquisition of the information transmission request message related to the autonomous driving disengagement event, in operation 1214, the electronic device 1000 transmits information related to the autonomous driving disengagement event to the server 1100.

In response to the acquisition of the autonomous driving disengagement event-related information, in operation 1216 the server 1100 generates training set data for deep learning using the autonomous driving disengagement event-related information.

In operation 1218, the server 1100 performs deep learning using the training set data, and in operation 1220, the server 1100 updates the autonomous driving algorithm.

In operation 1222, when the electronic device 1000 is switched to the autonomous driving mode by the user, in operation 1224, the electronic device 1000 drives in the autonomous driving mode. In addition, in response to reception of the new version of autonomous driving software from the server 1100 in operation 1226, the electronic device 1000 performs autonomous driving using the new version of autonomous driving software.

Figure 13:
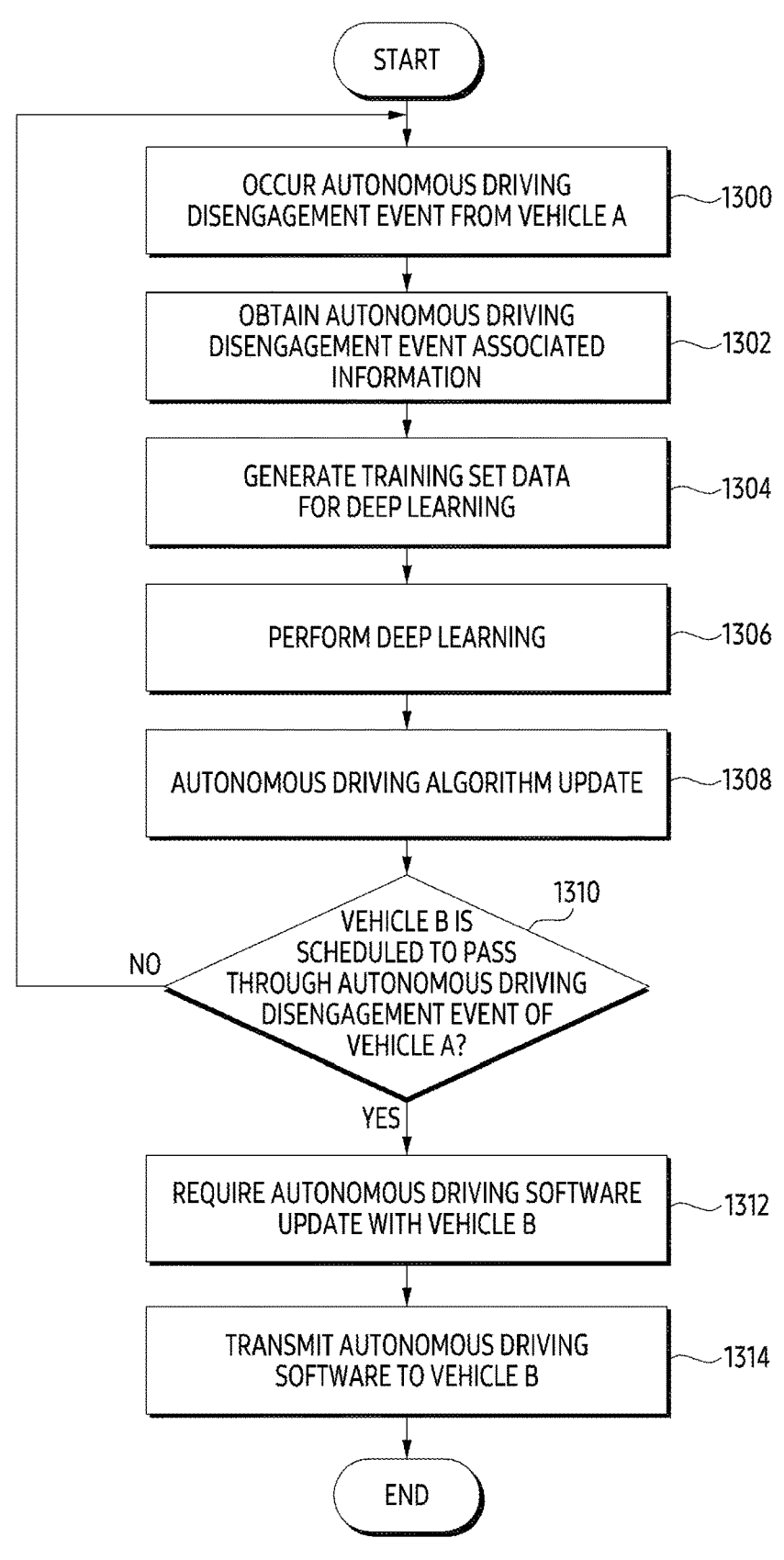
FIG. 13 is a signal flowchart illustrating an operation of an electronic device according to various embodiments.

FIG. 13 is a signal flowchart illustrating an operation of a server according to various embodiments.

In operation 1300, when it is confirmed that the autonomous driving disengagement event occurs from vehicle A, the server 1100 obtains information related to the autonomous driving disengagement event from vehicle A in operation 1302.

When the information related to the autonomous driving disengagement event is obtained, the server 1100 generates the autonomous driving event-related information as training set data for deep learning in operation 1304, performs deep learning with the training set data generated in operation 1306, and updates the autonomous software through the performed deep learning result in operation 1308.

In operation 1310, when it is confirmed in the server 1100 that the vehicle B will pass through a point where the autonomous driving disengagement event occurs in the vehicle A (1310—Yes), the server 1100 may require updating of autonomous driving software to the vehicle B in operation 1312, and transmit autonomous driving software to the vehicle B in operation 1314 to prevent occurrence of an autonomous driving disengagement event similar to that of the vehicle A. In operation 1310, the server 1100 may determine whether the following vehicle enters/passes a point where the autonomous driving release event occurs according to an embodiment since the server 1100 is connected to the autonomous vehicles through a network, and the path and location of each autonomous vehicle may be checked in real time. Of course, in order to protect the driver's personal information, tire server 1100 may obtain location information obtained from each vehicle regardless of identification information of the driver and/or the vehicle.

The device described above may be implemented as a combination of hardware components, software components, and/or hardware components and software components. For example, the devices and components described in the embodiments may be implemented using one or more general purpose computers or special purpose computers (For example, processors, controllers, arithmetical logic units (ALUs), digital signal processors, microcomputers, field programmable gate arrays (FPGA), PLUs, microprocessors, or any other device capable of executing and responding to instructions). The processing device may perform an operating system OS and one or more software applications performed on the operating system. In addition, the processing device may access, store, manipulate, process, and generate data in response to execution of the software. For convenience of understanding, the processing unit is sometimes described as being used, but A person of ordinary skill in the art will recognize that a processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or, independently or collectively, instruct the processing device. Software and/or data may be permanently or temporarily embodied in any type of machine, component, physical device, virtual equipment, computer storage medium or device, or transmitted signal wave to be interpreted by or to provide instructions or data to the processing device. The software may be distributed over networked computer systems and stored or executed in a distributed manner. Software and data may be stored in one or more computer-readable recording media.

The method according to the embodiment may be implemented in the form of program instructions that may be performed through various computer means and recorded in a computer-readable medium. The computer-readable medium may include a program command, a data file, a data structure, or the like alone or in combination. The program instructions recorded on the medium may be specially designed and configured for embodiments or may be known to and usable by those skilled in the art. Examples of the computer-readable recording medium include a hardware device specially configured to store and execute program instructions, such as a hard disk, magnetic media such as floppy disks and magnetic tapes, optical media such as CD-ROMs and DVDs, magneto-optical media such as floptical disks, and ROM, RAM, flash memory, and the like. Examples of program instructions include machine language codes, such as those created by compilers, as well as advanced language codes that can be executed by computers using interpreters or the like. The hardware device described above may be configured to operate as one or more software modules to perform the operation of the embodiment, and vice versa.

Although embodiments have been described according to limited embodiments and drawings as above, various modifications and modifications are possible from the above description to those of ordinary skill in the art. For example, even if the described techniques are performed in a different order from the described method, and/or components such as the described system, structure, device, circuit, etc. are combined or combined in a different form from the described method, or are substituted or substituted by other components or equivalents, appropriate results may be achieved.

Therefore, other implementations, other embodiments, and equivalents to the claims are also within the scope of the following claims.

The invention claimed is:
1. An electronic device comprising:
communication circuitry;

a memory storing a plurality of instructions; and at least one processor operably coupled to the communication circuitry and the memory, wherein the plurality of instructions, when being executed by the at least one processor, cause the at least one processor to:

receive, through the communication circuitry, from a first external electronic device, video;

receive, through the communication circuitry from the first external electronic device, a first signal to identify an impact amount being applied to the first external electronic device greater than a threshold impact amount;

based on receiving the first signal, obtain information associated with the received video;

based on obtaining the information, transmit, through the communication circuitry to a second external electronic device, a second signal including at least portion of the information; and wherein the video is transmitted from the first external electronic device to the electronic device, based on identifying, by a third external electronic device that is associated with the second external electronic device and is located in a vehicle comprising the first external electronic device, that an electronic map displayed on the third external electronic device does not correspond to the video obtained by the first external electronic device.

2. The electronic device of claim 1, wherein the video is transmitted from the first external electronic device to the electronic device, on a condition that a driving mode of a vehicle comprising the electronic device is changed from an autonomous driving mode to a manual driving mode.

3. The electronic device of claim 1, wherein the plurality of instructions, when being executed by the at least one processor, cause the at least one processor to:

store the video, based on the reception of the first signal; and discard the video after specified time elapses, based on the first signal not received.

4. The electronic device of claim 3, wherein a length of a time interval that maintains to store the video is changed based on a type of the first signal.

5. The electronic device of claim 1, wherein the plurality of instructions, when being executed by the at least one processor, cause the at least one processor to obtain the information associated with the video, by recognizing the video based on the first signal by using a neural network.

6. The electronic device of claim 1, wherein the second signal causes the second external electronic device to identify one or more terminals associated with the at least portion of the information.

7. A method for operating an electronic device with communication circuitry, the method comprising:

receiving, through the communication circuitry from a first external electronic device, video;

receiving, through the communication circuitry, from the first external electronic device, a first signal to identify an impact amount being applied to the first external electronic device greater than a threshold impact amount;

based on receiving the first signal, obtain information associated with the received video;

based on obtaining the information, transmitting, through the communication circuitry to a second external electronic device, a second signal including at least portion of the information; and wherein the video is transmitted from the first external electronic device to the electronic device, based on identifying, by a third external electronic device that is associated with the second external electronic device and is located in a vehicle comprising the first external electronic device, that an electronic map displayed on the third external electronic device does not correspond to the video obtained by the first external electronic device.

8. The method of claim 7, wherein the video is transmitted from the first external electronic device to the electronic device, on a condition that a driving mode of a vehicle comprising the electronic device is changed from an autonomous driving mode to a manual driving mode.

9. The method of claim 7, wherein the method further comprises:

storing, based on the reception of the first signal, the video;

discarding, based on the first signal not received, the video after specified time elapses.

10. The method of claim 9, wherein a length of a time interval that maintains to store the video is changed based on a type of the first signal.

11. The method of claim 7, the method comprising:

obtaining the information associated with the video, by recognizing the video based on the first signal by using a neural network.

12. The method of claim 7, wherein the second signal causes the second external electronic device to identify one or more terminals associated with the at least portion of the information.

* * * * *